US012749991B2

(12) United States Patent
Zhang et al.

(10) Patent No.: US 12,749,991 B2
(45) Date of Patent: Sep. 29, 2026

(54) SYSTEM AND METHOD FOR PROVIDING INRUSH CURRENT LIMITING FOR INDUCTION MOTOR STARTING

(71) Applicant: ABB SCHWEIZ AG, Baden (CH)

(72) Inventors: Yuzhi Zhang, Apex, NC (US); Xiaoqing Song, Apex, NC (US); Pietro Cairoli, Cary, NC (US); Taosha Jiang, Cary, NC (US)

(73) Assignee: ABB SCHWEIZ AG, Baden (CH)

( * ) Notice: Subject to any disclaimer, the term of this patent is extended or adjusted under 35 U.S.C. 154(b) by 264 days.

(21) Appl. No.: 18/748,887

(22) Filed: Jun. 20, 2024

(65) Prior Publication Data

US 2025/0392237 A1 Dec. 25, 2025

(51) Int. Cl.
*H02P 1/26* (2006.01)
*H02P 1/04* (2006.01)

(52) U.S. Cl.
CPC . *H02P 1/26* (2013.01); *H02P 1/04* (2013.01)

(58) Field of Classification Search
CPC .................................... H02P 1/26; H02P 1/04
See application file for complete search history.

(56) References Cited

U.S. PATENT DOCUMENTS

2015/0180377 A1* 6/2015 Hua ........................ H02P 23/14 318/778
2016/0134224 A1* 5/2016 Bock ...................... H01H 89/00 318/473
2019/0199247 A1* 6/2019 Jefferies ................. H01H 9/542

* cited by examiner

*Primary Examiner* — Zoheb S Imtiaz
(74) *Attorney, Agent, or Firm* — Greenberg Traurig, LLP

(57) ABSTRACT

A system for providing inrush current limiting for induction motor starting. The system utilizes a pre-start controller to initialize operation of a controller including multiple switches for controlling the voltage delivered to a motor having multiple phases. The pre-start controller activates each switch and determines whether a phase current flowing through the switches satisfies a threshold current. The switches are deactivated a phase current satisfies the threshold current. The pre-start controller determines an activation order for each phase and orders phases having higher phase currents higher in the order than lower phase currents, and determines an activation timing. Based on whether the highest phase current is positive or negative, the pre-start controller then activates, using a voltage at a corresponding angle and based on the activation order and activation timing, the phases to de-saturate the flux generated by the phase currents, thereby limiting an inrush current provided to the motor.

20 Claims, 23 Drawing Sheets

600

800

1900

1902

SYSTEM AND METHOD FOR PROVIDING INRUSH CURRENT LIMITING FOR INDUCTION MOTOR STARTING

FIELD OF THE TECHNOLOGY

At least some embodiments disclosed herein relate to electrical machines, inrush current limiting technologies, motor control technologies, semiconductor device technologies, flux desaturation technologies, and more particularly, but not limited to, a system and method for providing inrush current limiting for induction motor starting.

BACKGROUND

Electrical machines, such as motors or generators, are utilized to convert between electricity and mechanical energy as torque associated with a rotating motor shaft. Generators transform the input mechanical power into output electricity, and motors transform the input electrical energy to mechanical energy. Motors can be used for a variety of different applications, such as, but not limited to, industrial fans, blowers and pumps, machine tools, factory equipment, conveyors, vehicles, industrial equipment, appliances, and the like. A variety of different types of motors exist, which utilize different types of electrical power. Electrical machines can be utilized in a variety of applications to create products, facilitate business operations, and perform useful services. As a result, electrical machines can often be critical to the performance of a business. One often utilized electrical machine is the alternating current (AC) induction motor. AC induction motors are often utilized for various processes and industrial machinery, such as but not limited to, fans and air conditioners, water pumps, automobiles, compressors, and other types of machinery. When the AC induction motor is switched on by direct on-line (DOL) start, the motor experiences a high inrush current.

Typically, the highest level of inrush current occurs during the first half-cycle of motor operation and can be more than ten times the motor's full-load current. High inrush current can cause false tripping of protective devices, voltage dips in the supply line deteriorating the grid quality, or even prevent the motor from starting properly. For high efficiency induction motors which promise increased energy efficiency by reducing stator impedance, the inrush current may be even higher due to smaller stator impedance. The high motor inrush current can also greatly stress the motor starter, especially for the solid state (e.g., semiconductor device based) motor starter, by generating significant amount of heat within a short period of time. Motors, such as DOL induction motor constitute the majority of industrial loads, and being able to improve the energy efficiency and reliability in industrial applications has become increasingly more important due to new energy regulations. For standard efficiency DOL induction motors, the starting current may need be controlled to prevent overcurrent and overtemperature, especially in the first few current cycles. To address the high inrush current, the semiconductor devices in the solid state motor starter can be over-designed, such as by utilizing high current level power semiconductor switches, which are expensive to produce. Additionally, the cooling systems for such devices need to be carefully designed to address the thermal stress. Furthermore, existing technologies often deploy the use of electromechanical types of starters, which can withstand high inrush currents based on low on-state resistance. However, the number of operations on such electromechanical components is often limited due to arcing in every on/off control and based on the aging and erosion of contactors. Utilizing high current rated semiconductor devices results in wasting of margin and higher costs, utilizing greater numbers of semiconductor devices can reduce thermal stress, but result in greater costs and parasitic inductance impacting current sharing performance. While existing current inrush limiting techniques and technologies provide various benefits, such techniques and technologies may be enhanced to provide more effective inrush limitation capabilities, reduced thermal stress on components, and other benefits, while simultaneously reducing costs.

SUMMARY

A system and accompanying methods for providing inrush current limiting for induction motor starting is provided. In certain embodiments, the system and methods provide control algorithms and functionality for a motor controller, such as a solid-state motor controller that can limit the motor inrush current during a motoring starting process. For example, the system and methods can limit the inrush current during a direct-on-line (DOL) start of an alternating current (AC) induction motor. In certain embodiments, the system and methods can control the on and off timing of semiconductor switches of a motor controller to reduce the root mean square (RMS) or real-time starting current, while also reducing thermal or other stresses to a safe range. In certain embodiments, the system and methods can include utilizing a unique pre-start controller that controls the semiconductor devices of a controller of the motor to determine the initial flux of the motor. The pre-start controller can then turn on the semiconductor devices of the controller to de-saturate the initial flux of the motor, thereby reducing the inrush current in the first cycle. In certain embodiments, the functionality and capabilities provided by the system and methods can be applied to various types of motors of different horsepower, mechanical loads, and/or other specifications and features. In certain embodiments, the pre-start controller can facilitate reduction of the current and thermal stress affecting a motor, while also increasing the power density of the solid-state controller of the motor.

A system for providing inrush current limiting for induction motor starting is provided. In certain embodiments, the system can include a voltage source configured to provide voltage, a motor including a plurality of phases, and a controller including a plurality of switches and configured to control the voltage delivered to the motor by the voltage source. In certain embodiments, the system can also include a pre-start controller that is configured to perform various operative functionality of the system. In certain embodiments, the pre-start controller can be configured to initialize, during a pre-start process, one or more control signals to activate operation of the controller. In certain embodiments, the pre-start controller can be configured to activate each switch of the plurality of switches of the controller. In certain embodiments, the pre-start controller can be configured to determine whether one or more phase currents flowing through the plurality of switches of the controller satisfies a threshold current. In certain embodiments, the pre-start controller can be configured to deactivate, based on the one or more phase currents flowing through the one or more switches satisfying the threshold current, the plurality of switches of the controller. In certain embodiments, the pre-start controller can be configured to determine, for a motor flux de-saturation process, an activation order for each phase of the plurality of phases, wherein a first phase of the plurality of phases having a highest phase current and a second phase of the plurality of phases having a second highest phase current have an earlier position in the activation order than a third phase of the plurality of phases having a lowest phase current. In certain embodiments, the pre-start can be configured to determine, for the motor flux de-saturation process, an activation timing for each phase of the plurality of phases. In certain embodiments, the pre-start controller can be configured to activate, using the voltage at a first angle and based on the activation order and the activation timing, the first phase and the second phase to activate corresponding first and second switches of the plurality of switches to de-saturate a highest flux generated via the highest phase current, thereby limiting an inrush current provided when starting the motor.

In certain embodiments, a pre-start controller for providing inrush current limiting for induction motor starting is provided. In certain embodiments, the pre-start controller can include control circuitry and/or other components to facilitate the operative functionality. In certain embodiments, the control circuitry can be configured to initialize, during a pre-start process, one or more control signals to activate operation of a controller comprising a plurality of switches and configured to control voltage delivered to a motor by a voltage source. In certain embodiments, the pre-start controller can be configured to activate each switch of the plurality of switches of the controller. In certain embodiments, the pre-start controller can be configured to determine whether one or more phase currents flowing through the plurality of switches of the controller satisfies a threshold current. In certain embodiments, the pre-start controller can be configured to deactivate, based on the one or more phase currents flowing through the at least one switch satisfying the threshold current, the plurality of switches of the controller. In certain embodiments, the determine, for a motor flux de-saturation process, an activation order for each phase of the plurality of phases, wherein a first phase of the plurality of phases having a highest phase current and a second phase of the plurality of phases having a second highest phase current have an earlier position in the activation order than a third phase of the plurality of phases having a lowest phase current. In certain embodiments, the pre-start controller can be configured to activate, using the voltage at a first angle and based on the activation order, the first phase and the second phase to activate corresponding first and second switches of the plurality of switches to de-saturate a highest flux generated via the highest phase current, thereby limiting an inrush current provided when starting the motor.

A method for providing inrush current limiting for induction motor starting is provided. In certain embodiments, the method can be performed by any components, devices, and/or systems as described in the present disclosure. In certain embodiments, the method can include initializing, during a pre-start process and by utilizing a pre-start controller, one or more control signals to activate operation of a controller comprising a plurality of switches and configured to control voltage delivered to a motor by a voltage source. In certain embodiments, the method can include activating each switch of the plurality of switches of the controller. In certain embodiments, the method can include determining whether one or more phase currents flowing through the plurality of switches of the controller satisfies a threshold current. In certain embodiments, the method can include deactivating, based on the one or more phase currents flowing through the one or more switches satisfying the threshold current, the plurality of switches of the controller. In certain embodiments, the method can include determining, for a motor flux de-saturation process, an activation order for each phase of the plurality of phases. In certain embodiments, a first phase of the plurality of phases having a highest phase current and a second phase of the plurality of phases having a second highest phase current have an earlier position in the activation order than a third phase of the plurality of phases having a lowest phase current. In certain embodiments, the method can include activating, using the voltage at a first angle and based on the activation order, the first phase and the second phase to activate corresponding first and second switches of the plurality of switches to de-saturate a highest flux generated via the highest phase current, thereby limiting an inrush current provided when starting the motor.

These and other features of the systems and methods for providing inrush current limiting for induction motor starting are described in the following detailed description, drawings, and appended claims.

BRIEF DESCRIPTION OF THE DRAWINGS

The embodiments of the present disclosure are illustrated by way of example and not limited by the figures of the accompanying drawings in which like references indicate similar elements. Embodiments of the present disclosure will be described in even greater detail below based on the exemplary figures. The present disclosure is not limited to the exemplary embodiments. All features described and/or illustrated herein can be used alone or combined in different combinations in embodiments of the present disclosure. The features of various embodiments of the present disclosure will become apparent by reading the following detailed description with reference to the attached drawings which illustrate the following.

DETAILED DESCRIPTION

Figure 1:
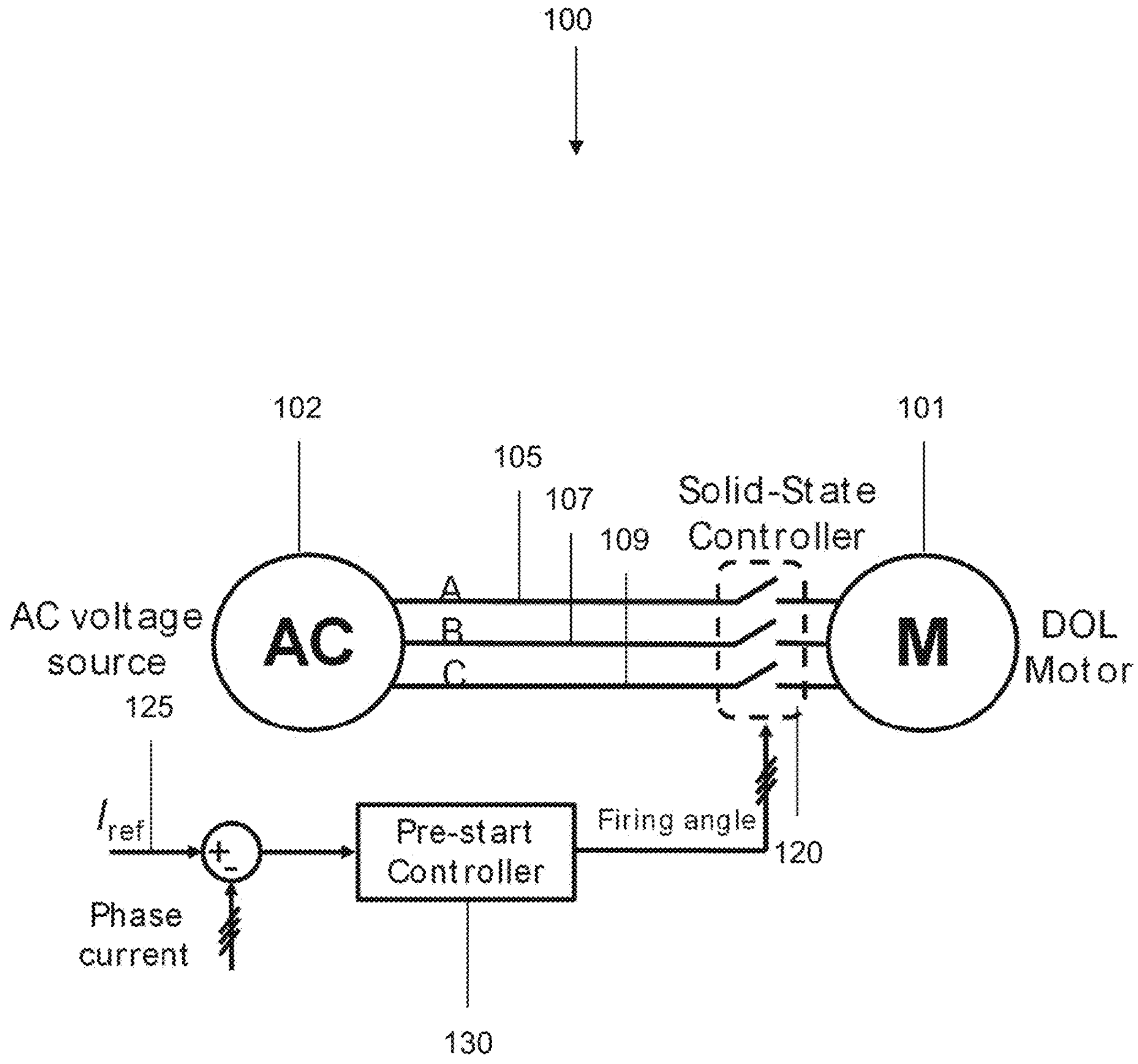
FIG. 1 is a schematic diagram of a system that includes a pre-start controller for a solid-state controller to limit the inrush current of a motor according to embodiments of the present disclosure.

The present disclosure describes various embodiments of systems and methods for providing inrush current limiting for motor starting. The system and accompanying methods, for example, be utilized to limit the induction machine inrush current during DOL starting of a motor, such as by a voltage source directly connected to the motor. In certain embodiments, the system and methods incorporate the use of a pre-start controller for a solid-state controller of a motor to reduce the peak value of the starting inrush current, such as during an initial cycle of motor operation. By reducing the peak value of the starting inrush current, the system and methods reduce stresses on the semiconductor switches of the controller and the motor itself, thereby increasing controller and motor longevity, while simultaneously reducing the need for complex or expensive semiconductor switches or replacement of components of motors. In certain embodiments, the system and methods can control the on and off timing of semiconductor switches of a motor controller to reduce the RMS or real-time starting current to facilitate reduction of thermal or other stresses to a safe range. In certain embodiments, the system and methods can include utilizing the unique pre-start controller to control the semiconductor devices of the controller of the motor to determine the initial flux of the motor. In certain embodiments, the pre-start controller can then turn on the semiconductor devices of the controller to de-saturate the initial flux of the motor, thereby reducing the inrush current in the initial cycle. In certain embodiments, the functionality and capabilities provided by the system and methods can be applied to various types of motors of different horsepower, mechanical loads, and/or other specifications and features. In certain embodiments, the pre-start controller can facilitate reduction of the current and thermal stress affecting a motor, while also increasing the power density of the solid-state controller of the motor.

A system for providing inrush current limiting for induction motor starting is provided. In certain embodiments, the system can include a voltage source configured to provide voltage, a motor including a plurality of phases, and a controller including a plurality of switches and configured to control the voltage delivered to the motor by the voltage source. In certain embodiments, the system can also include a pre-start controller that is configured to perform various operative functionality of the system. In certain embodiments, the pre-start controller can be configured to initialize, during a pre-start process, one or more control signals to activate operation of the controller. In certain embodiments, the pre-start controller can be configured to activate each switch of the plurality of switches of the controller. In certain embodiments, the pre-start controller can be configured to determine whether one or more phase currents flowing through the plurality of switches of the controller satisfies a threshold current. In certain embodiments, the pre-start controller can be configured to deactivate, based on the one or more phase currents flowing through the one or more switches satisfying the threshold current, the plurality of switches of the controller. In certain embodiments, the pre-start controller can be configured to determine, for a motor flux de-saturation process, an activation order for each phase of the plurality of phases, wherein a first phase of the plurality of phases having a highest phase current and a second phase of the plurality of phases having a second highest phase current have an earlier position in the activation order than a third phase of the plurality of phases having a lowest phase current. In certain embodiments, the pre-start controller can be configured to determine, for the motor flux de-saturation process, an activation timing for each phase of the plurality of phases. In certain embodiments, the pre-start controller can be configured to activate, using the voltage at a first angle and based on the activation order and the activation timing, the first phase and the second phase to activate corresponding first and second switches of the plurality of switches to de-saturate a highest flux generated via the highest phase current, thereby limiting an inrush current provided when starting the motor.

In certain embodiments, the pre-start controller of the system can be further configured to activate the third phase to activate a corresponding third switch of the plurality of switches of the controller after the first and second switches are activated. In certain embodiments, the pre-start controller of the system can be configured to activate the third phase when a motor flux associated with the first and third phase matches a voltage source flux associated with the first and third phase, or a motor flux associated with the second and third phase matches a voltage source flux associated with the second and third phase, the third phase activated based on whichever matched first. In certain embodiments, the pre-start controller of the system can be further configured to complete starting of the motor after the first, second, and third phases are activated. In certain embodiments, the pre-start controller of the system can be further configured to activate each switch of the plurality of switches after determination that a direct-on-line start for the motor has occurred. In certain embodiments, the pre-start controller of the system can be further configured to initiate a soft-start control for the motor to start the motor if the direct-on-line start for the motor has not occurred. In certain embodiments, the pre-start controller of the system can be further configured to transmit, in response to each switch of the plurality of switches being activated, a signal to the controller indicating that the motor flux de-saturation process is finished. In certain embodiments, the pre-start controller of the system can be further configured to determine whether the first phase having the highest phase current is greater than or equal to zero, and use the voltage at the first angle to activate the first and second phases based on the first phase having the highest phase current being determined to be greater than or equal to zero.

In certain embodiments, the pre-start controller of the system can be further configured to activate, using the voltage at a second angle and based on the first phase having the highest phase current being determined to be less than zero, the activation order, and the activation timing, the first phase and the second phase to activate corresponding first and second switches of the plurality of switches to de-saturate the highest flux generated via the highest phase current, thereby limiting an inrush current provided when starting the motor. In certain embodiments, the pre-start controller of the system can be further configured to monitor a motor status associated with the motor to determine whether a fault in the motor, the voltage source, or a combination thereof, exists. In certain embodiments, the pre-start controller of the system can be further configured to save the one or more phase currents flowing through the plurality of switches of the controller when the one or more phase currents satisfy the threshold current. In certain embodiments, the pre-start controller of the system can be further configured to determine the activation order for each phase of the plurality of phases based on an absolute value of each phase current of the plurality of phases In certain embodiments, a pre-start controller for providing inrush current limiting for induction motor starting is provided. In certain embodiments, the pre-start controller can include control circuitry and/or other components to facilitate the operative functionality. In certain embodiments, the control circuitry can be configured to initialize, during a pre-start process, one or more control signals to activate operation of a controller comprising a plurality of switches and configured to control voltage delivered to a motor by a voltage source. In certain embodiments, the pre-start controller can be configured to activate each switch of the plurality of switches of the controller. In certain embodiments, the pre-start controller can be configured to determine whether one or more phase currents flowing through the plurality of switches of the controller satisfies a threshold current. In certain embodiments, the pre-start controller can be configured to deactivate, based on the one or more phase currents flowing through the at least one switch satisfying the threshold current, the plurality of switches of the controller. In certain embodiments, the determine, for a motor flux de-saturation process, an activation order for each phase of the plurality of phases, wherein a first phase of the plurality of phases having a highest phase current and a second phase of the plurality of phases having a second highest phase current have an earlier position in the activation order than a third phase of the plurality of phases having a lowest phase current. In certain embodiments, the pre-start controller can be configured to activate, using the voltage at a first angle and based on the activation order, the first phase and the second phase to activate corresponding first and second switches of the plurality of switches to de-saturate a highest flux generated via the highest phase current, thereby limiting an inrush current provided when starting the motor.

In certain embodiments, the control circuitry can be further configured to receive a signal providing a value for the threshold to compare to the one or more phase currents. In certain embodiments, the control circuitry can be further configured to determine, for the motor flux de-saturation process, an activation timing for each phase of the plurality of phases. In certain embodiments, the control circuitry can be further configured to activate the first phase, the second phase, and third phase in accordance with the activation timing. In certain embodiments, the control circuitry is further configured to de-saturate a second highest flux generated via the second highest phase current, a third highest flux generated via the lowest phase current, or a combination thereof.

A method for providing inrush current limiting for induction motor starting is provided. In certain embodiments, the method can be performed by any components, devices, and/or systems as described in the present disclosure. In certain embodiments, the method can include initializing, during a pre-start process and by utilizing a pre-start controller, one or more control signals to activate operation of a controller comprising a plurality of switches and configured to control voltage delivered to a motor by a voltage source. In certain embodiments, the method can include activating each switch of the plurality of switches of the controller. In certain embodiments, the method can include determining whether one or more phase currents flowing through the plurality of switches of the controller satisfies a threshold current. In certain embodiments, the method can include deactivating, based on the one or more phase currents flowing through the one or more switches satisfying the threshold current, the plurality of switches of the controller. In certain embodiments, the method can include determining, for a motor flux de-saturation process, an activation order for each phase of the plurality of phases. In certain embodiments, a first phase of the plurality of phases having a highest phase current and a second phase of the plurality of phases having a second highest phase current have an earlier position in the activation order than a third phase of the plurality of phases having a lowest phase current. In certain embodiments, the method can include activating, using the voltage at a first angle and based on the activation order, the first phase and the second phase to activate corresponding first and second switches of the plurality of switches to de-saturate a highest flux generated via the highest phase current, thereby limiting an inrush current provided when starting the motor.

In certain embodiments, the method can further include determining, for the motor flux de-saturation process, an activation timing for each phase of the plurality of phases. In certain embodiments, the method can further include activating the first phase and the second phase using the voltage at the first angle in accordance with the activation timing. In certain embodiments, the method can further include receiving a command to initialize the pre-start process.

Referring now to FIG. 1, a schematic diagram of a system 100 that includes a pre-start controller 130 for a solid-state controller 120 to limit the inrush current provided to a motor 101 according to embodiments of the present disclosure is provided. For the purposes of the present disclosure, other types of devices can be substituted for the motor 101 and/or in combination with the motor 101, such as, but not limited to, any type of electrical machine. In certain embodiments, the system 100 can include a variety of components, devices, and features. For example, the system 100 can include a motor 101, a voltage source 102, a plurality of wires 105, 107, 109 (or conductors, leads, windings, etc.), a solid-state controller 120, a reference current signal 125, a pre-start controller 130, any other component and/or devices, or a combination thereof. In certain embodiments, the motor 101 can be any type of motor and can be utilized for a manufacturing process, a packaging process, a factory-based process, a distribution process, any other type of process, or a combination thereof. In certain embodiments, the motor 101 can be a DOL induction motor and/or any other type of motor. Additionally, in certain embodiments, the motor 101 can be part of a larger or more complex machine and can be configured to facilitate the operative functionality of the larger or more complex machine, such as by generating rotational motion to drive machinery and components. In certain embodiments, motor configuration of the motor 101 can be configured to support alternating current synchronous or asynchronous (in case of induction motors) operation. In certain embodiments, the motor 101 can include a plurality of components including, but not limited to, a rotating electric motor shaft, an electric machine enclosure, a terminal box, power leads, a neutral or ground lead, a stator, stator windings, a rotor, bearings, shields, cooling fans, housings and/or frames, other components, or a combination thereof. In FIG. 1, the exemplary motor 101 can be a DOL induction motor and/or a rotating electrical machine that is configured to convert electrical energy to mechanical energy. Torque may be transmitted via a rotating electric machine shaft to connected loads. In certain embodiments, the motor shaft can protrude from the forward end of the electric machine enclosure that encloses and houses the internal operating components of the motor 101. In certain embodiments, the motor enclosure may be made from any suitable structural material such as, but not limited to, cast iron, steel, aluminum, plastics or other suitable materials, and the motor enclosure may be configured according to various frame sizes that determine the location and arrangement of mounting features. In certain embodiments, the motor enclosure may be designated in accordance with any of several enclosure types, such as open drip proof (ODP) or totally enclosed fan cooled (TEFC) that determine how the motor 101 is constructed to interact with the operating environment to provide for cooling and protect the internal components against contaminants, such as moisture and dust. In certain embodiments, the motor shaft can be supported to rotate with respect to and defines a rotational axis of the motor 101.

In certain embodiments, the motor 101 can receive power from a power source, such as voltage source 102. In certain embodiments, the voltage source 102 can serve as the power supply that provides electrical energy necessary to start and operate the motor 101. For example, the voltage source 102 can supply the alternating current voltage to energize the stator windings of the motor 101, which can then create a rotating magnetic field according to the magnetic flux generated by the windings. In certain embodiments, such as when the voltage source 102 is a single-phase voltage source, the voltage source 102 can provide single-phase alternating current power. In certain embodiments, such as when the voltage source 102 is a poly-phase voltage source, such as a three-phase voltage source, the voltage source 102 can be obtained from a utility grid or generated locally using a three-phase power supply. In certain embodiments, the voltage source 102 can be configured to have a frequency that matches the motor's 102 rated frequency. In certain embodiments, the voltage source 102 can comprise any number of voltage sources 102 and can include components, such as, but not limited to, circuit breakers, fuses, overload relays and/or other voltage source components.

In order to receive electric current from the voltage source 102, the motor 101 can include a conduit box or terminal box located at an appropriate location on the motor enclosure from which a plurality of power leads (e.g., wires 105, 107, 109), such as insulated conductive wires, can extend. The power leads can be electrically connected to and complete a circuit with the voltage source 102 that provides electricity having appropriate electrical characteristics and properties for operation of the motor 101. In certain embodiments, the motor 101 can be configured to operate on poly-phase, alternating current power source. In a poly-phase power system, the plurality of power leads can each supply alternating current and voltage of the same frequency (or other desired frequency) to the motor 101, however, the alternating current conducted in each power lead (e.g., wires 105, 107, 109) may be out of phase with that in the other power leads. Accordingly, the cyclic oscillations between 0°-360° of alternating current in each power lead may be delayed or advanced with respect to that in the other power leads. As an example, a three-phase motor 101 can include three power leads that conduct alternating currents that are 120° out of phase with each other and a fourth neutral or ground lead that can be connected to an electrical ground, for example, the motor frame, and that serves as a reference. In certain embodiments, a three-phase motor 101 can include additional power leads, such as power leads for connecting to and/or powering one or more external accessories (e.g., user-accessible power ports). For example, the motor 101 can include primary and auxiliary coils (e.g., windings). The primary coils (e.g., stator windings) may be powered via the power leads. The primary coils may be coupled to the auxiliary coils (e.g., windings) such that when powered by the power leads, the primary coils can induce voltages and currents in the auxiliary coils. Based on the foregoing, the auxiliary coils may be electrically connected to accessory devices such as the user-accessible power ports (e.g., additional power leads within the terminal box that are configured to power user devices) and/or sensor devices.

In order to actuate rotation of the electric machine shaft 102, the electric machine 100 may include a rotor and a stator. In certain embodiments, the rotor can be generally cylindrical in shape and can be assembled about the extension of the shaft that can be located within the enclosure of the motor 101. The rotor can be configured to electromagnetically interact with an annular stator in which the rotor is disposed. The cylindrical rotor and the annular stator can be concentrically aligned with the rotational axis of the motor 101 defined by the motor 101 shaft. In certain embodiments, the annular stator may be fixedly disposed concentrically around the rotor and can be spaced apart and separated therefrom by an annular air gap. In certain embodiments, the stator can include a stator core that may be made from a magnetically permeable material, such as iron or steel. The stator core may be made from a plurality of annularly shaped core laminations that are axially arranged as a stack and extend coaxially along the rotational axis. The stator core may be fixed to and enclosed in the motor enclosure, which may include fins, water cooling jackets, and other components to facilitate cooling.

In order to accommodate the conductive coils (e.g., the primary coils or stator windings) that conduct current to generate the magnetic field, the stator core may include a plurality of stator teeth that are radially arranged in the circumferential direction around the rotational axis and circumferentially separated from each other by stator slots radially disposed into the inner cylindrical surface of the stator core. Hence, between each two adjacent stator teeth, there can be disposed a stator slot so that the teeth and slots circumferentially alternate about the inner cylindrical surface of the stator core. The alternating stator teeth and stator slots may axially extend along the axial length of the stator core with respect to the rotational axis. The conductive coils (e.g., primary windings or stator coils or windings) may be elongated wires of copper or other conductive material that are wound or looped about the stator teeth and accommodated in the stator slots. The conductive windings may be wound around a stator tooth or a plurality of stator teeth a number of successive times, each time being referred to as a "turn." The total number of turns of the conducting winding about the same stator tooth or stator teeth forms a "coil." For example, in certain embodiments, a coil may be formed from multiple turns of the conductive coils. In certain embodiments, any type of coil formed in any type of manner can also be utilized as well. The conductive wires of the conductive coils may then be directed around additional stator teeth that are spaced from the initial coil in a continuous manner until the conductive coils circumscribe the inner circumference of the stator core. The path and geometry of the conductive coils around the stator core may be referred to as the "winding (or coil) pattern," and the winding pattern can take various arrangements and may determine the electrical characteristics and operating principles of the motor 101.

For example, the winding pattern may assign or allocate the coils by phases and by pole-phase groups. The phases may include the coils that are electrically connected in series to the same electrical phase of the poly-phase power source. For example, in a three-phase power system, for the motor 101 to receive three-phase power, a first phase conductor may be associated with "A" phase current, a second phase conductor may be associated with "B" phase current, and a third phase conductor may be associated with "C" phase current. The phase conductors may be electrically connected with the power leads. The series of coils that are electrically connected to a respective one of the first, second, and third phase conductors may be referred to as a phase. The number of coils included with each phase can be dependent upon the number of stator teeth and stator slots.

Operatively, when the first, second, and third phase conductors are energized from a three-phase power system with alternating electric current that is 120° degrees out of phase by the respective conductor, the current flowing in the plurality of phases can generate a magnetic field that circumferentially rotates around the rotational axis. As the polarity of one phase connected to the first conductor begins to change, e.g., from north to south, due to the periodic reversal of the direction of the alternating current associated with phase "A", the polarity of the adjacent phase may become stronger because it is connected to the second or third phase conductor carrying current 120° degrees out of phase with the first conductor. The combined changing polarity from all phases can produce a circumferentially rotating magnetic field around the rotor. For an induction machine, such certain embodiments of motor 101, this rotating magnetic field crosses through the air gap and induces voltage and consequently current in the rotor conductors. The rotor field due to rotor conductor current lags behind the stator field, and hence the rotor undergoes a torque that causes it to rotate in the direction of the rotating magnetic field. In the case of permanent magnet rotors, the rotor fields due to magnet poles experiences torque due to the rotating stator field and may rotate in synchronous speed with the stator field. In the case of a synchronous reluctance motor, the rotor may be constructed with variable reluctances having same number of reluctance variations as of stator number of poles. The rotating stator field from the stator and variable reluctance from the rotor creates rotational torque for the synchronous reluctance rotor to rotate at synchronous speed. The synchronous speed in turn depends on the fundamental frequency of the supplied voltage to the motor phases. The rotor is thus caused to rotate with respect to the rotational axis. However, while aspects of the disclosure may be described with respect to poly-phase alternating current power systems, aspects of the disclosure will also be applicable to other types of power systems and electric machine configurations.

In certain embodiments, the system 100 can include a controller 120 (e.g., a solid-state controller), which can be utilized to connect the voltage source 102 with the motor 101. In certain embodiments, the controller 120 can include switches (e.g., semiconductor switches, such as, thyristors, triacs, insulated gate bipolar transistors, MOSFETs) that can be utilized to regulate the electrical power supplied to the motor 101, and can control the motor's operation, such as the motor speed, motor torque, starting and stopping of the motor, and other functionality. In certain embodiments, the switches can precisely and efficiently control through the rapid on and off switching of the electrical current and/or by modulating the voltage and current. In certain embodiments, the semiconductor switches can enable soft starting and stopping, speed control, and/or other functionality. In certain embodiments, the switches can open and close the wires 105, 107, 109 between the voltage source 102 and motor 101 to enable or disable current flow from the voltage source 102 to the motor 101, such as during a motor start operation or otherwise. In certain embodiments, the controller 120 can provide various functionality and features with respect to the motor 101. For example, the controller 120 can provide speed control (e.g., variable frequency drive implementation), soft-starting and stopping capabilities for the motor 101, torque control for the motor 101, overload protection, short circuit protection, phase loss and imbalance protection, and other features and functionality. In certain embodiments, the controller 120 can include programmable controllers to enable the setting of operating parameters and control schemes for the motor 101. Such operating parameters and control schemes can include, but are not limited to, acceleration times, deceleration times, fault conditions, speed parameters, and the like. In certain embodiments, the controller 120 can include thyristors, to control the voltage applied to the motor 101, insulated gate bipolar transistors for high-frequency switching and control of the alternating current output voltage and frequency, diodes for rectifying alternating current to direct current, control circuitry (e.g., microcontrollers or digital signal processors) to process input signals and generate control signals, such as for semiconductor devices of the controller 120, sensors to measure current and voltage and to facilitate monitoring and adjustments, a user interface to enable the setting of parameters, monitor motor 101 status, and detect fault conditions, a communication interface to communicate with components of the system 100 and/or external to the system 100 (e.g., system 2300), and/or any other components.

Figure 2:
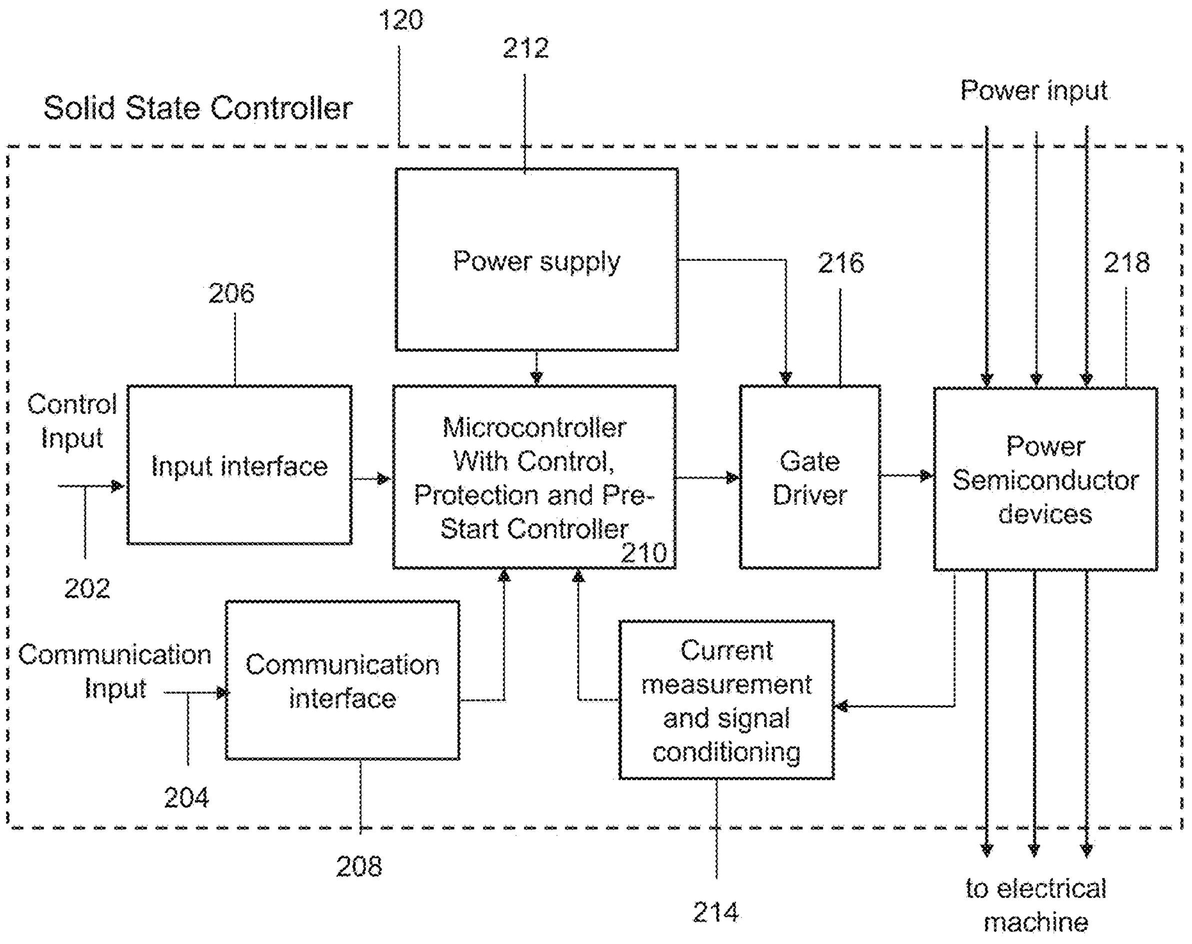
FIG. 2 is a schematic diagram of an exemplary controller for an induction motor that includes an integrated pre-start controller for limiting the inrush current of a motor according to embodiments of the present disclosure.

In certain embodiments, the system 100 can include a pre-start controller 130, which can be connected to the controller 120 and can be configured to control the controller 120 and/or various components of the system 100. In certain embodiments, the pre-start controller 130 can be separate from the controller 120 (e.g., as shown in FIG. 1), and, in certain embodiments, the pre-start controller 130 can be integrated with the controller 120 (e.g., as shown in FIG. 2). In certain embodiments, the pre-start controller 130 can be configured to facilitate pre-start activity associated with the motor 101. For example, the pre-start controller 130 for the controller 120 can be utilized to limit the starting (i.e., inrush) current provided to the motor 101, such as by the voltage source 102 through the wires 105, 107, 109. In certain embodiments, the pre-start controller 130 can be configured to control activation or deactivation of the switches of the controller 120, execute motor flux de-saturation control processes to de-saturation the flux generated by the phase currents for each of the phases of the motor 101 (i.e., to limit the inrush current), execute soft-start controls for the motor 101, conduct any of the operative functionality as described in the present disclosure, or a combination thereof.

Figure 3:
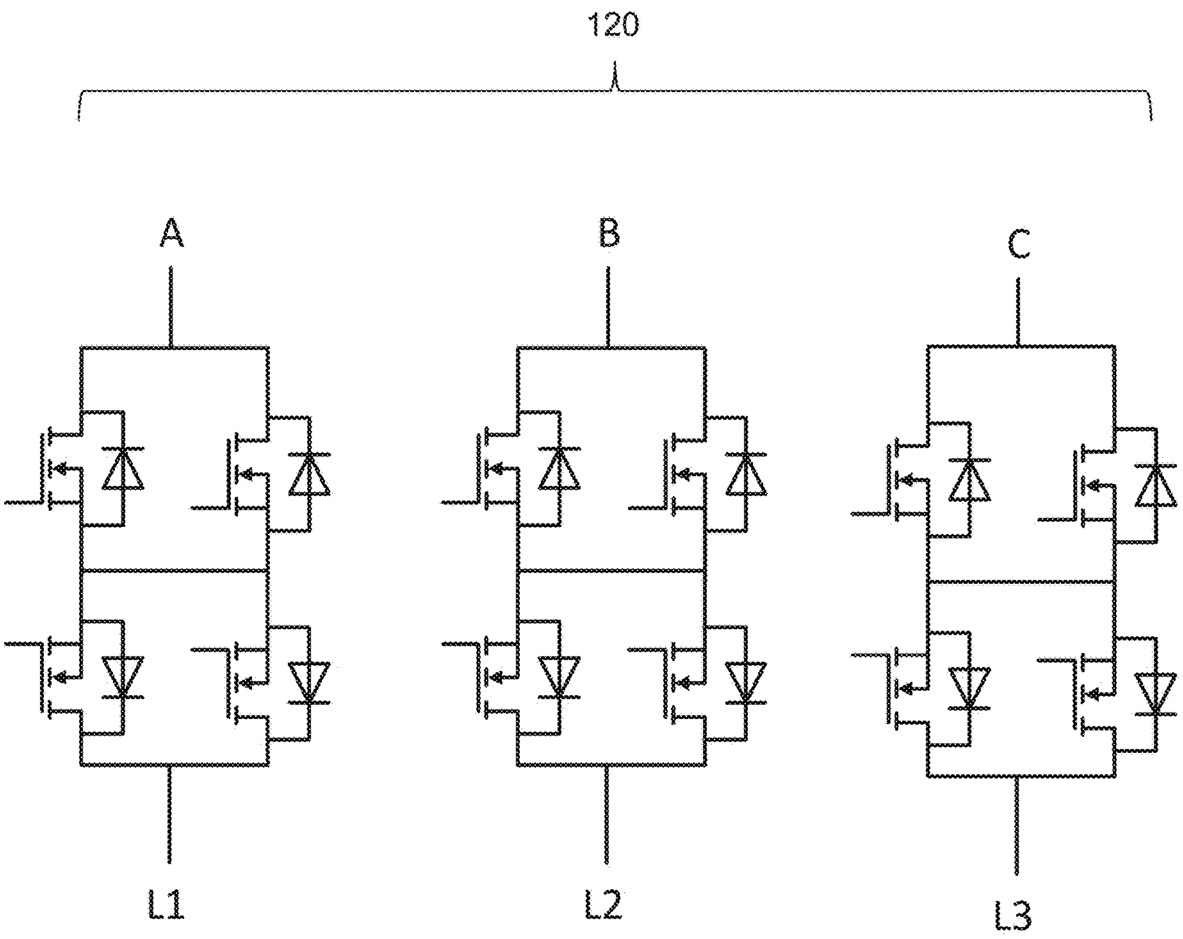
FIG. 3 is an exemplary solid-state controller for a motor according to embodiments of the present disclosure.

Referring now also to FIG. 2, a schematic diagram of an exemplary controller 120 for an induction motor 101 that includes an integrated pre-start controller 130 for limiting the inrush current of the motor 101 according to embodiments of the present disclosure is shown. The controller 120 can be utilized with the system 100, any of the methods described herein, and/or any other systems. In certain embodiments, the controller 120 can be a solid-state controller and can include a control input 202 that can be received via an input interface 206, a communication input 204 that can be received via a communication interface 208, a microcontroller 210 (e.g., including control protection and the pre-start controller 13), a power supply 212 configured to deliver power to the controller 120, a gate driver 216 configured to provide the necessary voltage and current to turn on and off the power semiconductor devices (e.g., switches), a current measurement and signaling component (e.g., sensor) for measuring current and voltage and providing feedback associated with the measured current and voltage, semiconductor devices 218 (e.g., switches) connected to power input and to the motor 101 (e.g., via the wires 105, 107, 109), any other components, or a combination thereof. Referring now also to FIG. 3, an exemplary structure of a controller 120 is shown for various phases A, B, C.

Figure 4:
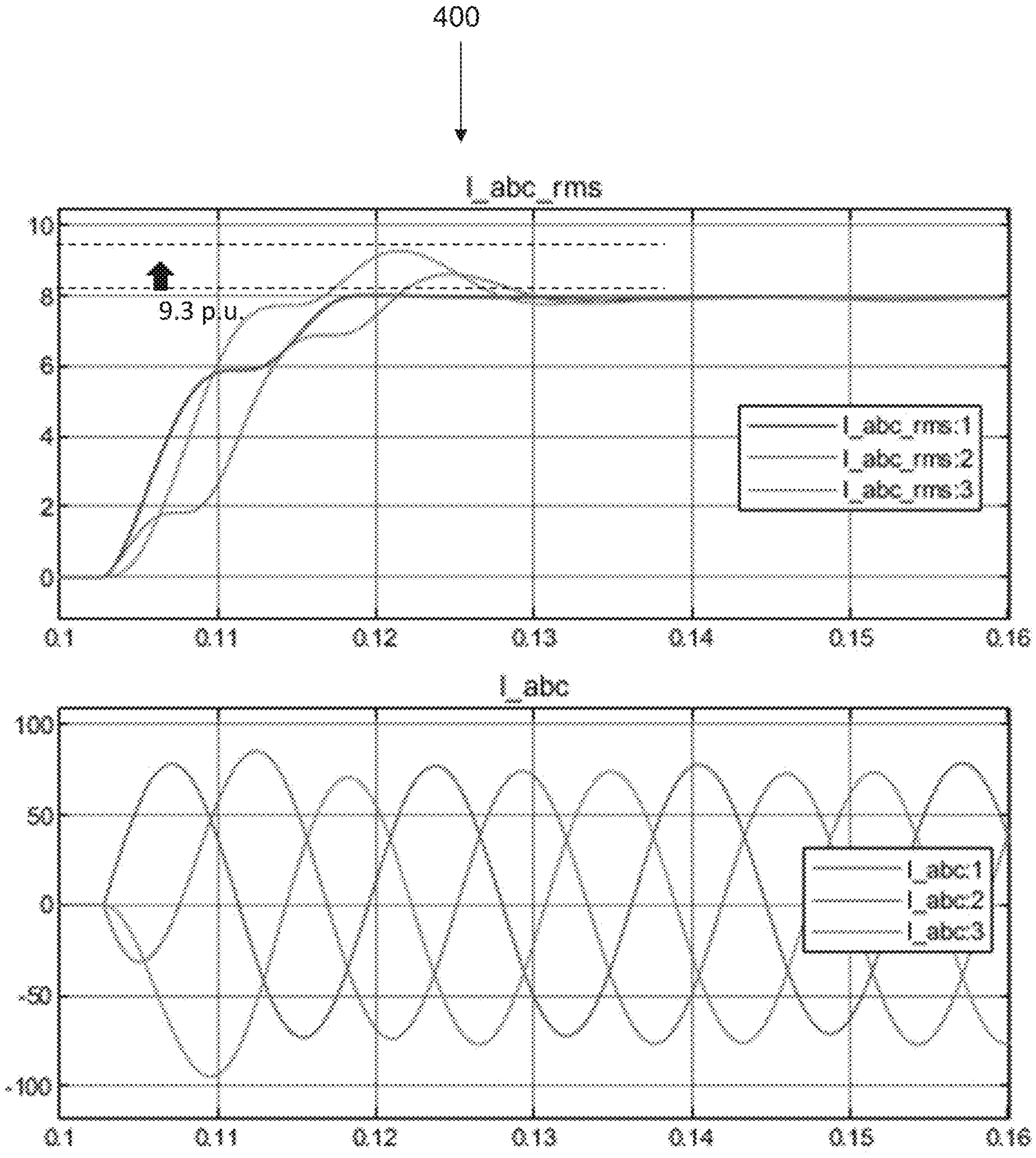
FIG. 4 are exemplary graphs illustrating starting currents using traditional DOL control according to embodiments of the present disclosure.
Figure 5:
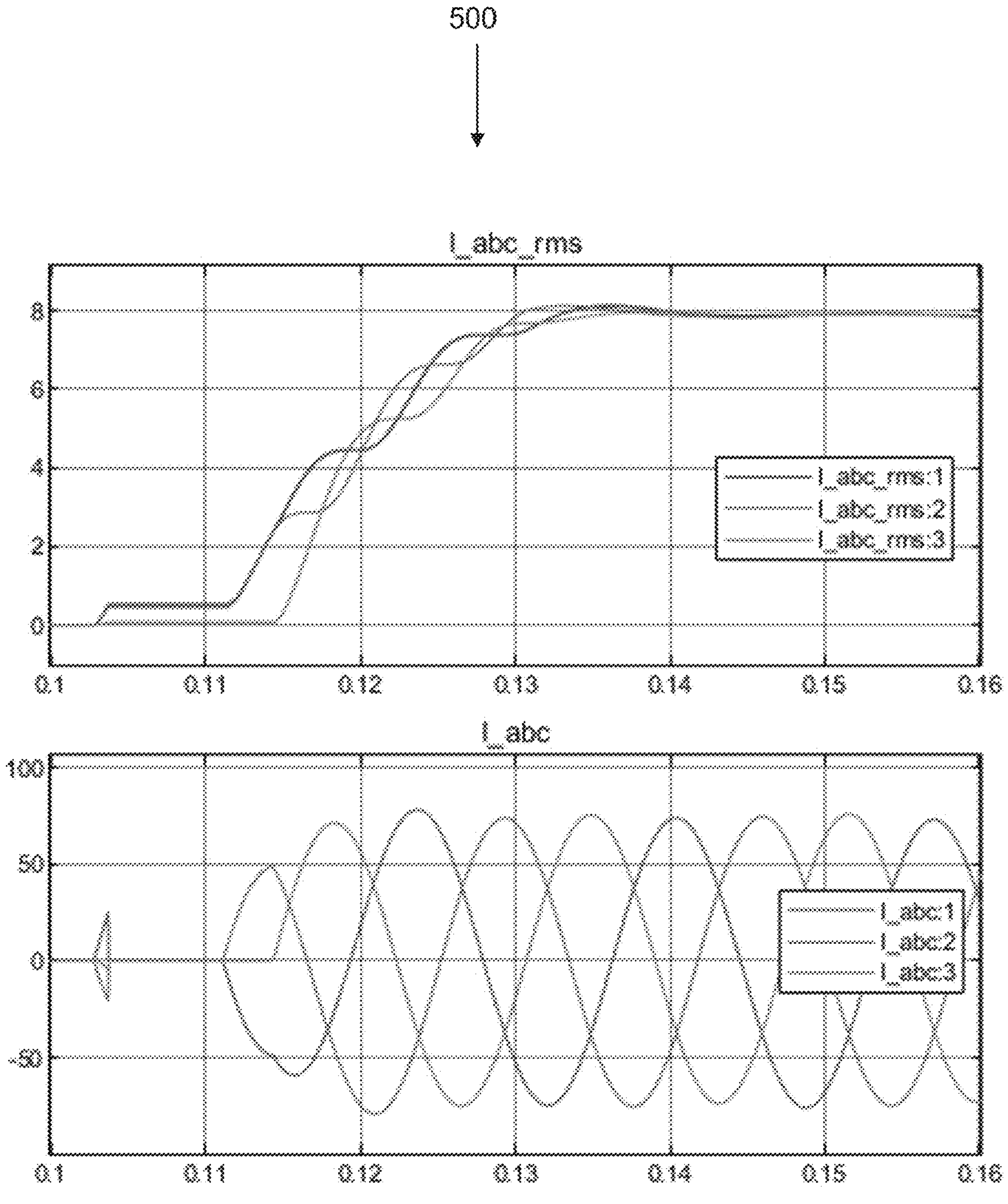
FIG. 5 are exemplary graphs illustrating starting currents after utilizing the pre-start controller according to embodiments of the present disclosure.
Figure 6:
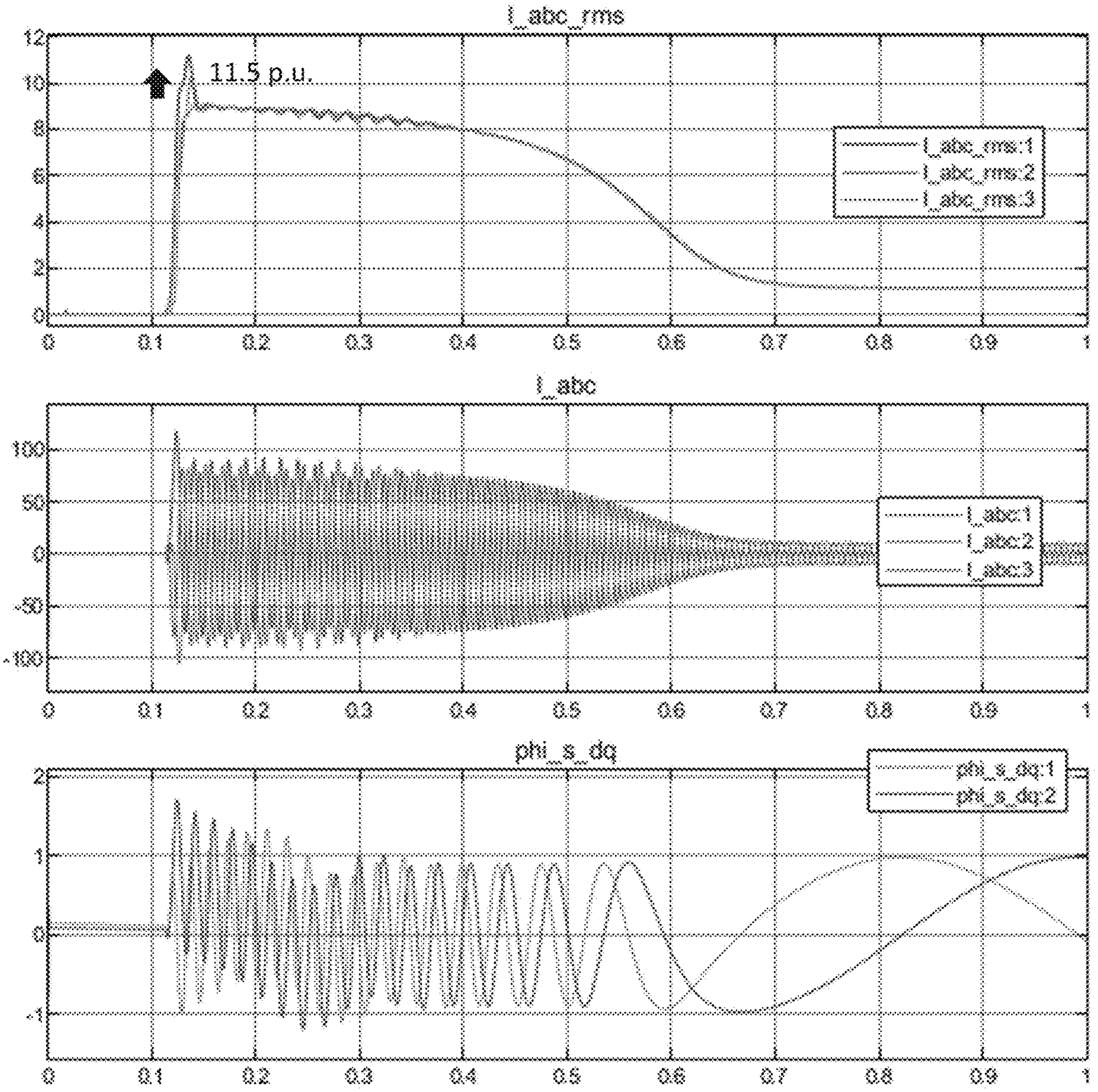
FIG. 6 illustrates exemplary graphs of motor root mean square current, motor current, and motor flux for a motor without utilizing the systems of the present disclosure.
Figure 7:
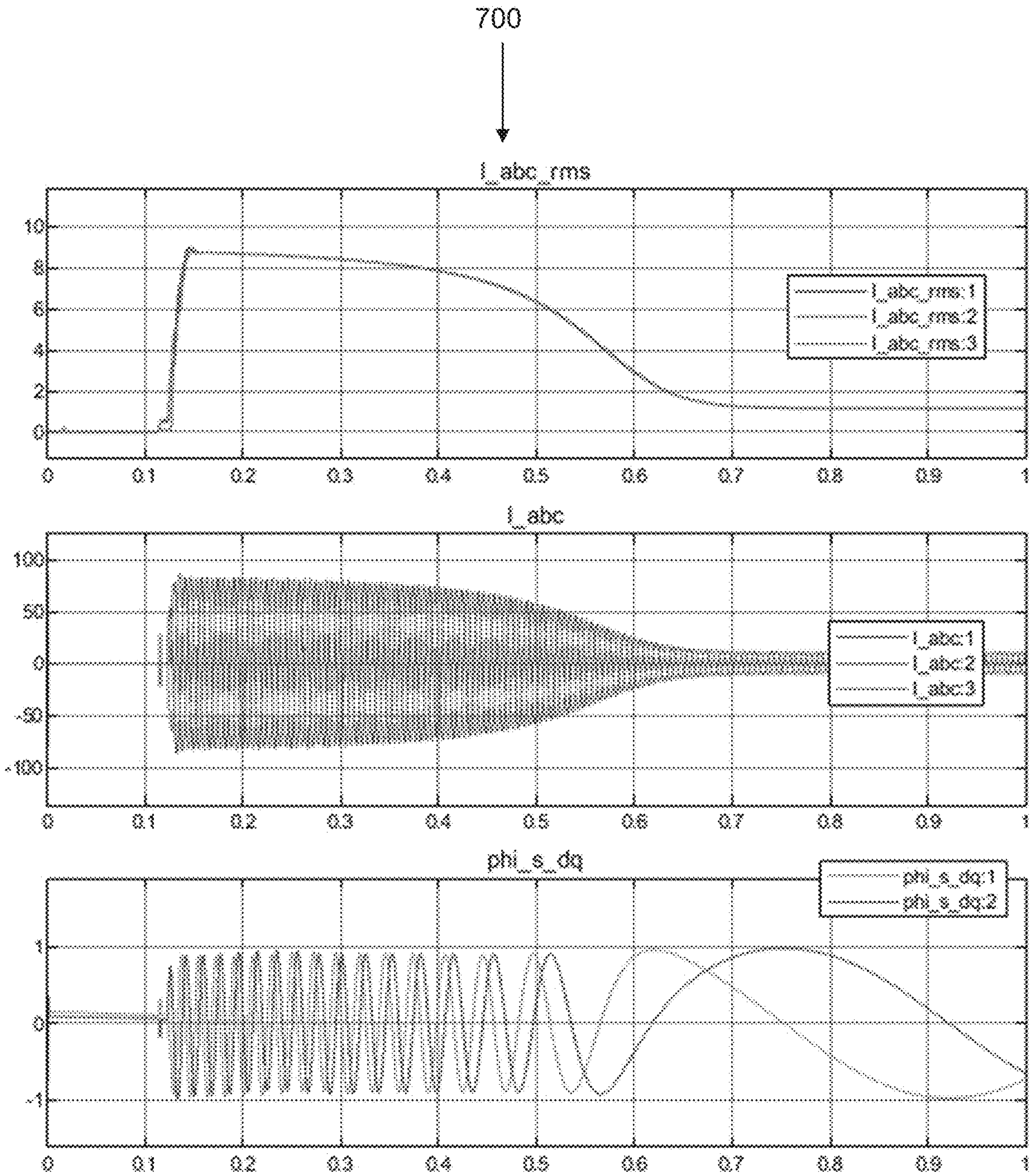
FIG. 7 illustrates exemplary graphs of motor root mean square current, motor current, and motor flux for a motor utilizing embodiments of systems of the present disclosure.

Referring now also to FIG. 4, graph 400 illustrates an exemplary starting current using a traditional DOL control without using the novel pre-start controller 130 and functionality described in the present disclosure. The corresponding graph 400 of the rms current in p.u. is shown in the top portion of the graph 400 and the real time current is shown at the bottom portion of the graph 400, where the x axis is time in seconds. With the conventional DOL starting method, the maximum rms current of the motor starting current is shown as 9.3 times the nominal current and the peak current is about 95 A in the first cycle of the starting current, as shown in FIG. 4. Referring now also to FIG. 5, graph 500 illustrates an exemplary starting current utilizing the pre-start controller 130 and functionality described in the present disclosure, where the rms current is shown in the top portion of the graph 500 and the real-time current is shown in the bottom portion of the graph 500. As shown in FIG. 5, using the pre-start controller 130, the starting current of the motor is limited to 8.1 times the nominal current. Referring now also to FIG. 6, example graphs 600 of limiting inrush current without utilizing the pre-start controller 130 and functionality of the present disclosure is shown. As is shown, without the pre-start controller 130, the peak rms current in the first cycle is 11.5 times of the nominal current. Referring now also to FIG. 7, example graphs 700 of limiting inrush current utilizing the pre-start controller 130 and functionality of the present disclosure is shown. As is shown, with the pre-start controller 130, the peak rms is reduce to 9 times the nominal current. The top portion of the graph 700 shows the motor rms current in p.u., the middle graph is the motor current, and the bottom graph is the motor flux, and the x axis is time in seconds.

Figure 8:
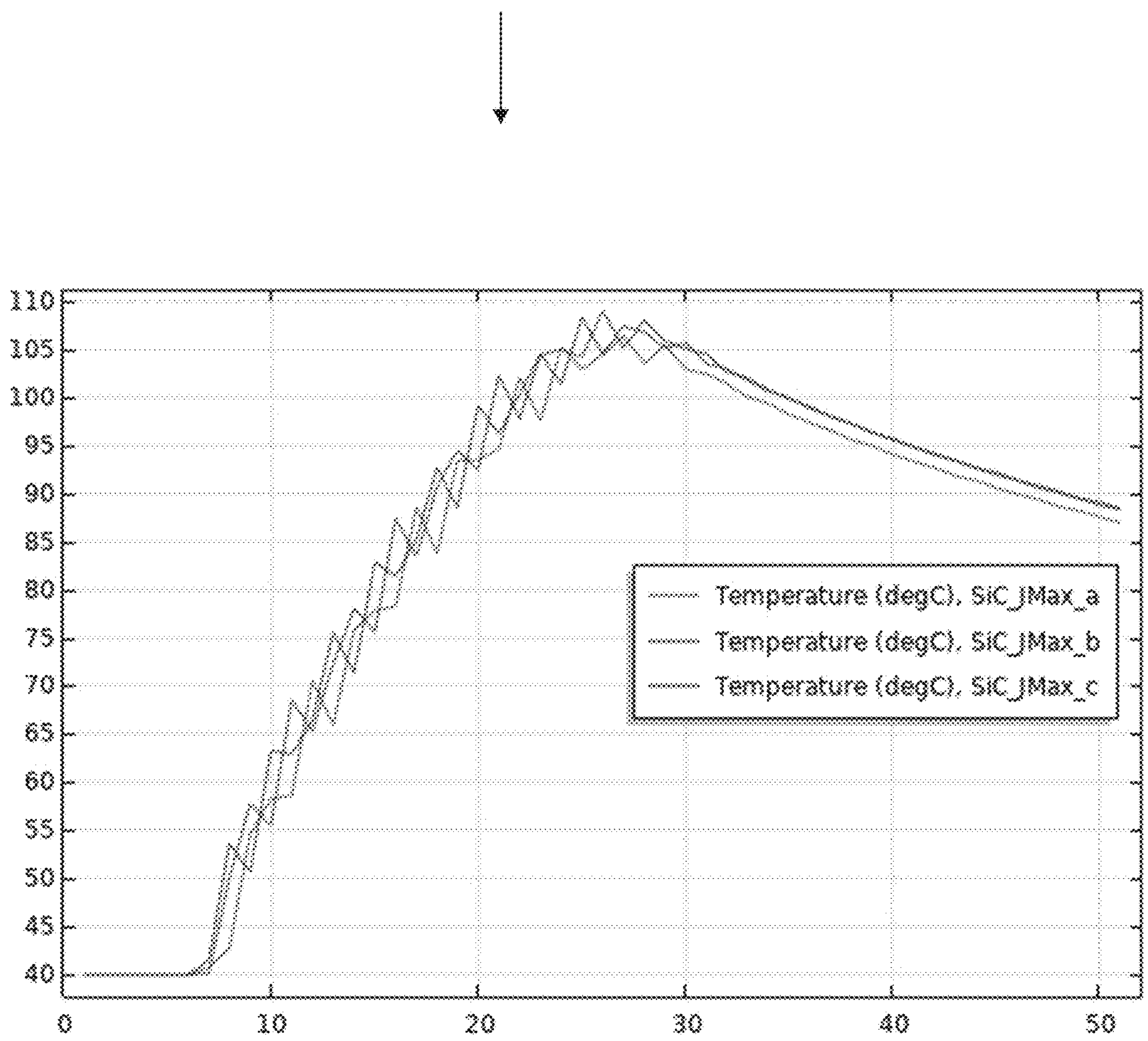
FIG. 8 is an exemplary graph illustrating junction temperature for a semiconductor device using a pre-start controller according to embodiments of the present disclosure.
Figure 9:
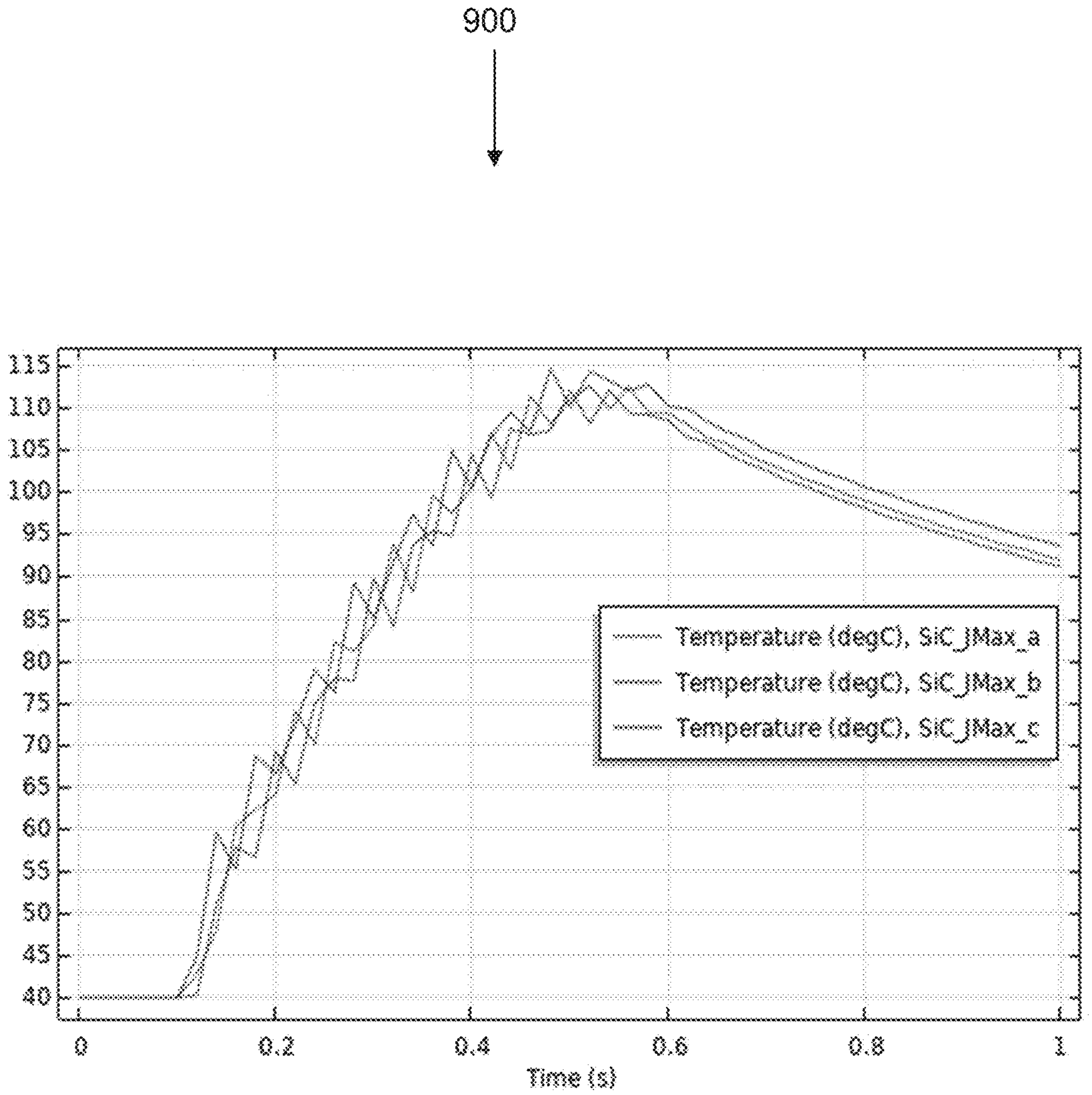
FIG. 9 is an exemplary graph illustrating junction temperature for a semiconductor device without using a pre-start controller of the present disclosure.

Referring now also to FIG. 8, exemplary graph 800 is shown which shows the junction temperature of a semiconductor device using the pre-start controller 130. For example, using the pre-start controller 130, the junction temperature reduction is about 6.5 degrees Celsius, which is about 10% of the junction temperature rise. This illustrates lower current and thermal stress to the semiconductor switches of the controller 120 and/or other components of the system 100. FIG. 9 is an exemplary graph of the junction temperature of the semiconductor switch without using the pre-start controller 130, which shows higher current and thermal stress than compared to the results shown in FIG. 8.

Figure 10:
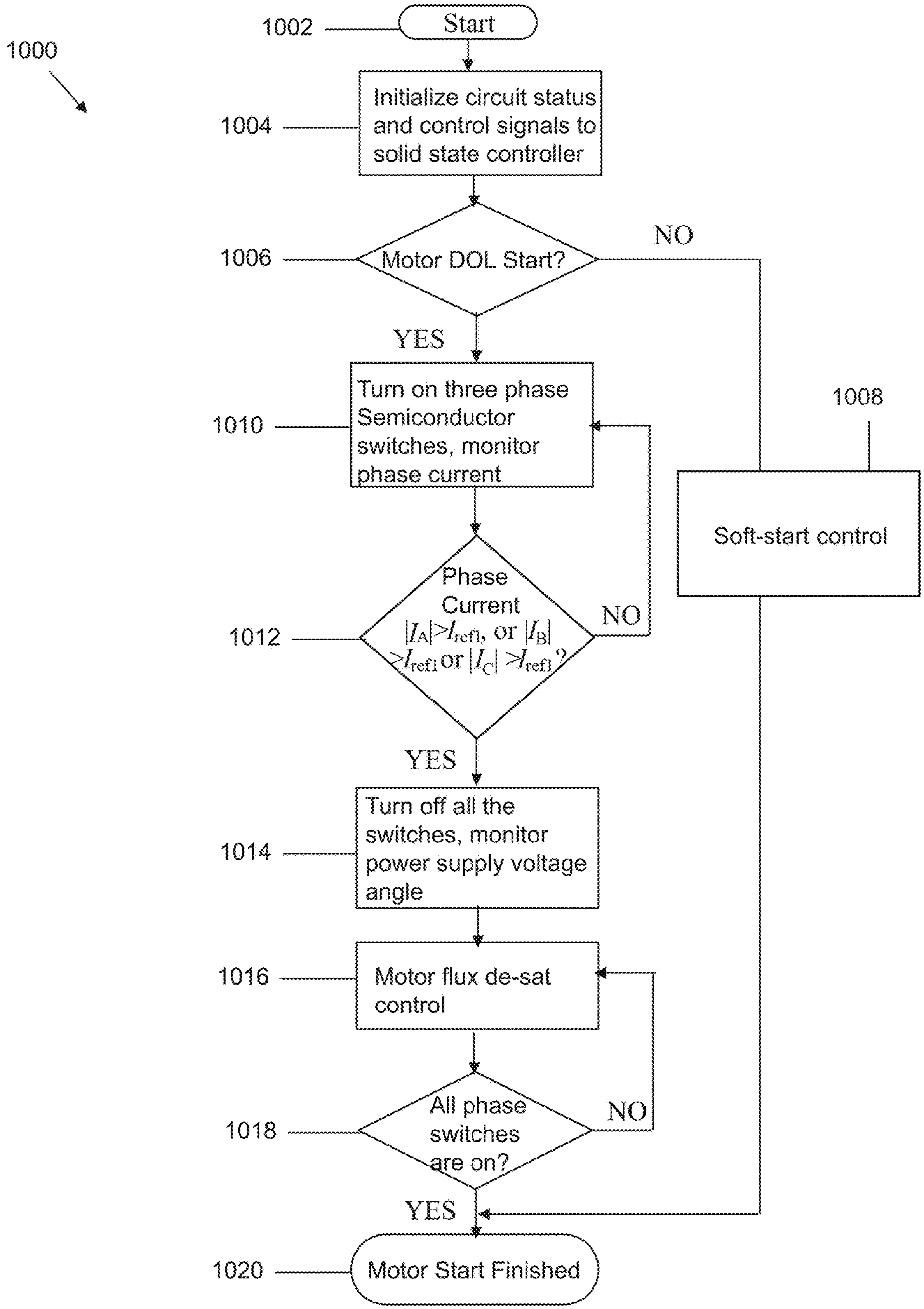
FIG. 10 is an exemplary method of a main control flow of a pre-start controller for providing inrush current limiting for induction motor starting according to embodiments of the present disclosure.

Referring now also to FIG. 10, an exemplary method 1000 of a main control flow of a pre-start controller 130 for providing inrush current limiting for induction motor starting according to embodiments of the present disclosure is shown. In certain embodiments, the method 1000 can be initiated at block 1002. Once the method 1000 is started at block 1002, the method 1000 can proceed to block 1004. At block 1004, the method 1000 can including initializing, by utilizing the pre-start controller 130, circuit status and control signals to controller 120 (e.g., solid-state controller). For example, in certain embodiments, block 1004 can include initializing, such as during a pre-start process and by utilizing the pre-start controller 130 of the system 100 including the motor 101, a control signal(s) to activate operation of a controller 120 (e.g., a solid-state controller) including a plurality of switches (e.g., semiconductor switches). In certain embodiments, for example, the control signals and/or motor start command can be initiated via a button of the motor 101, the pre-start controller 130, the controller 120, a toggle switch of the motor 101, a remote control system (e.g., system 2300), a soft starter, a control panel interface of the motor 101 and/or system 100, any other input mechanism, or a combination thereof. In certain embodiments, the motor start command and/or control signals can be utilized to activate or initiate operation of the motor 101. In certain embodiments, block 1004 can also include monitoring and/or determining a motor status of the motor 101 to ensure that there is no fault or malfunction with the motor 101 and/or the voltage source 102 (e.g., the power supply to the motor 101), such as by utilizing the pre-start controller 130.

At block 1006, the method 1000 can include determining whether a motor start is a direct-on-line (DOL) start. If the motor start is not a DOL start, the method 1000 can proceed to block 1008 and initiate a soft-start control for the motor 101. In certain embodiments, for example, the soft-start control at block 1008 can include utilizing the system 100 or a device to gradually ramp up the voltage suppled to the motor 101 during the startup of the motor 101. The gradual increase in voltage can be utilized to reduce the high inrush current and potential stresses incurred by the components of the motor 101 and/or system 100. In certain embodiments, the soft-start control can also include gradually increasing the torque to reduce potential mechanical shock to the motor and connected components and/or devices. After the soft-start control is performed at block 1008 and the motor is started using the soft-start control, the method 1000 can include proceeding to block 1020 where the motor start is finished and the motor 101 can continue operating to perform a particular tasks. If, however, at block 1006, a motor start is a DOL start or other similar type of start, the method 1000 can proceed to block 1010. At block 1010, the method 100 can include activating or turning on all of the switches of the multi-phase controller 120 (e.g., three-phase solid state controller), such as by utilizing the pre-start controller 130, and monitoring the phase currents generated and flowing through the wires, switches, and/or through the controller 120 connected to the motor 101.

Once the switches are activated (or turned on) by utilizing the pre-start controller 130, the method 1000 can proceed to block 1012, which can include determining whether any one or more of the phase currents for the phases connected to the motor 101 reach or satisfy a threshold current value. For example, the threshold current can be $I_{ref1}$ and if the phase current for phase A (i.e., $I_A$), the phase current for phase B (i.e., $I_B$), and/or the phase current for phase C (i.e., $I_C$) do not satisfy the threshold current, the method 100 can continue monitoring the phase currents at block 1010 until the threshold current value is satisfied. Once one or more of the phase currents satisfies the threshold current value, the method 1000 can proceed to block 1014. At block 1014, the method 1000 can include turning off or deactivating all of the switches of the controller 120 (e.g., solid-state controller) and monitoring the power supply/voltage source voltage angle. In certain embodiments, the deactivation can be performed by utilizing the pre-start controller 130 and/or other components of the system 100. At block 1016, the method 1000 can proceed to initiating a motor flux de-saturation control process to facilitate the reduction of inrush current to the motor 101. Further details relating to the motor flux-desaturation control process is shown in FIG. 11.

Figure 11:
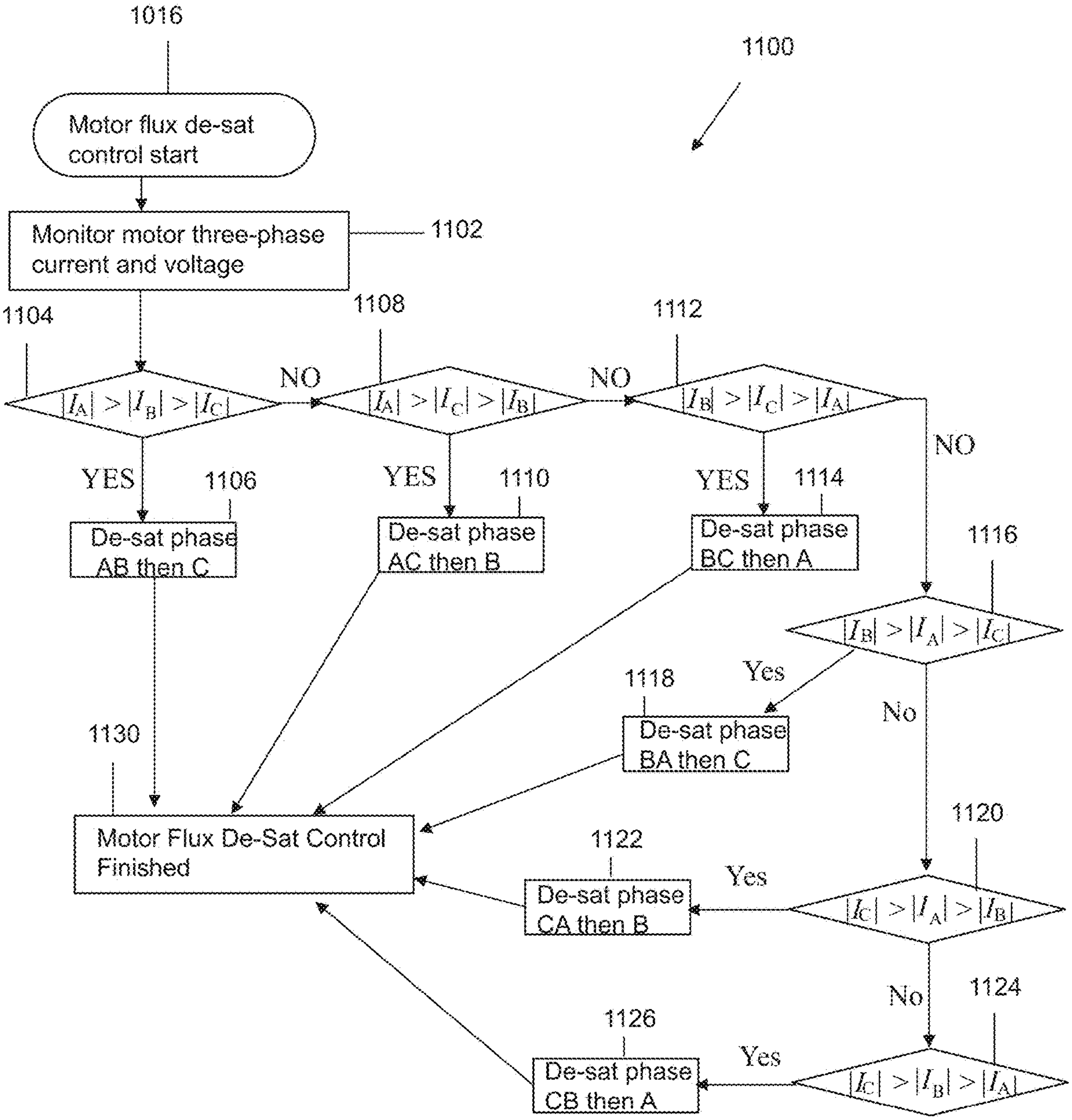
FIG. 11 illustrates an exemplary method for determining motor flux de-saturation order according to embodiments of the present disclosure.
Figure 12:
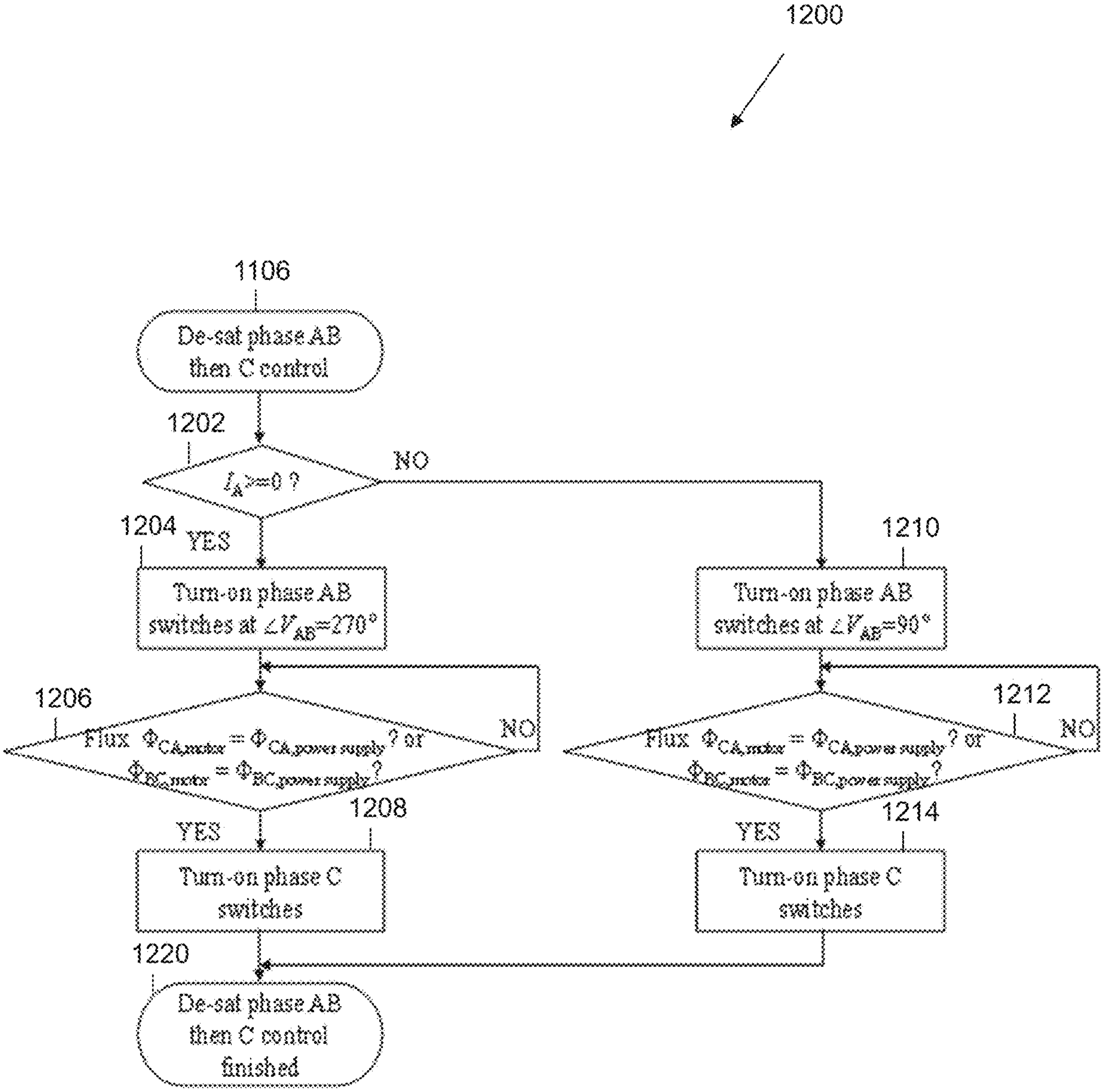
FIG. 12 illustrates an exemplary method for conducting motor flux de-saturation for a first sequence of phases according to embodiments of the present disclosure.

Referring now also to FIG. 11, a method 1100 for determining motor flux de-saturation order according to embodiments of the present disclosure is shown. In certain embodiments, the method 1100 can comprise the functionality, steps, processes, and/or operations for block 1016 of method 1000, which involves initiating the motor flux-desaturation control process to determine a motor flux de-saturation order for the fluxes generated based on the phase currents for each of the phases associated with the motor 101. In certain embodiments, the first block of method 1100 can be block 1016. At block 1102, the method 1100 can include monitoring the three-phase current and voltage for the plurality of phases to facilitate determination of the activation order (or turn on order) for each phase. In order to determine the activation order for the phases, the method 1100 can include, at block 1102, determining the absolute value of the three-phase current. In certain embodiments, the corresponding flux of the highest phase current can be the current that can be suppressed by the system 100 first. In certain embodiments, the top two highest fluxes corresponding to the top two highest phase currents can be the currents that are suppressed first by the system 100. For example, at decision block 1104, the method 1100 can include determining whether the absolute value of the phase current for phase A is greater than the absolute value of the phase current for phase B, and whether the absolute value of the phase current for phase B is greater than the absolute value of the phase current for phase C. If the foregoing is true, the method 1100 can proceed to block 1106 by conducting a de-saturation process for phase AB and then C (e.g., If phase $|I_A|$>phase $|I_B|$>Phase $|I_C|$, then turn-on order is switching on phase AB first, then phase C). Further details relating to the various exemplary possibilities for activation order and activation timing for the de-saturation process are shown in FIGS. 12, 13, 14, 15, 16 and 17. When proceeding to block 1106, additional sequences of operations or blocks can be conducted using method 1200, such as is shown in FIG. 12.

In FIG. 12, to conduct motor flux de-saturation, if the phase current of phase A is greater than the phase current of phase B, and the phase current of phase B is greater than the phase current of phase C, the fluxes associated with phase currents for phases AB can be de-saturated first and then the flux associated with the phase current for phase C can be de-saturated next. At block 1202, the method 1200 can include determining whether the phase current of A is greater than or equal to zero. If the phase current of A is greater than or equal to zero, the method 1200 can proceed to block 1204, which can include activating (or turning on) the phase AB switches at a first angle (e.g., $v_{AB}$ at 270°). Once the phase AB switches are activated at the first angle, the method 1200 can proceed to block 1206 where the method 1200 determines whether the flux $\varphi_{CA}$ of the motor is equal to the flux $\varphi_{CA}$ of the power supply, or the flux $\varphi_{BC}$ of the motor is equal to the flux $\varphi_{BC}$ of the power supply, whenever which of the phase-to-phase fluxes matched first. If neither match, the method 1200 continues to monitor until phase-to-phase fluxes match. If the flux $\varphi_{CA}$ of the motor is equal to the flux OCA of the power supply, or the flux $\varphi_{BC}$ of the motor is equal to the flux $\varphi_{BC}$ of the power supply, then the method 1200 can proceed to block 1208. At block 1208, the method 1200 can include activating the phase C switch of the controller 120. The method 1200 can then proceed to block 1220, which can finish the motor flux de-saturation process for phase AB and then C switches.

If, however, the phase current of A at block 1202 is less than zero (i.e., negative), the method 1200 can proceed from 1202 to 1210. Since the phase current of A is negative, the method 1200 can activate the phase AB switches at a second angle (e.g., $v_{AB}$ at 90°). The method 1200 can then proceed to block 1212, which can determine whether the flux $\varphi_{CA}$ of the motor is equal to the flux $\varphi_{CA}$ of the power supply, or the flux $\varphi_{BC}$ of the motor is equal to the flux $\varphi_{BC}$ of the power supply, whenever which of the phase-to-phase fluxes matched first. If neither match, the method 1200 continues to monitor until phase-to-phase fluxes match. If the flux OCA of the motor is equal to the flux $\varphi_{CA}$ of the power supply, or the flux $\varphi_{BC}$ of the motor is equal to the flux $\varphi_{BC}$ of the power supply, then the method 1200 can proceed to block 1214. At block 1214, the method 1200 an include activating the phase C switch of the controller 120. The method 1200 can then proceed to block 1220, which can finish the motor flux de-saturation process for phase AB and then C switches. Referring now back also to FIG. 11, the method 1100 can then proceed from block 1106 to block 1130, where the motor flux de-saturation control process is completed. Referring now also to FIG. 10, the method 1000 can then proceed to step 1018 and determine whether all the phase switches are activated, and, if so, proceeds to block 1020, where the motor start is finished and the motor 101 can continue to operate to perform a task at hand. In certain embodiments, block 1018 can be performed before block 1130.

Referring back now also to decision block 1104, if the absolute value of the phase current for phase A is not greater than the absolute value of the phase current for phase B, and the absolute value of the phase current for phase B is not greater than the absolute value of the phase current for phase C, the method 1100 can proceed to block 1108. At block 1108, the method 1100 can include determining whether the absolute value of the phase current for phase A is greater than the absolute value of the phase current for phase C, which is greater than the absolute value of the phase current for phase B. If the foregoing is true, the method 1100 can proceed to block 1110 by conducting a de-saturation process for phase AC and then B (e.g., If phase $|I_A|$>phase $|I_C|$>Phase $|I_B|$, then turn-on order is switching on phase AC first, then phase B). When proceeding to block 1110, additional sequences of operations or blocks can be conducted using method 1300, such as is shown in FIG. 13.

Figure 13:
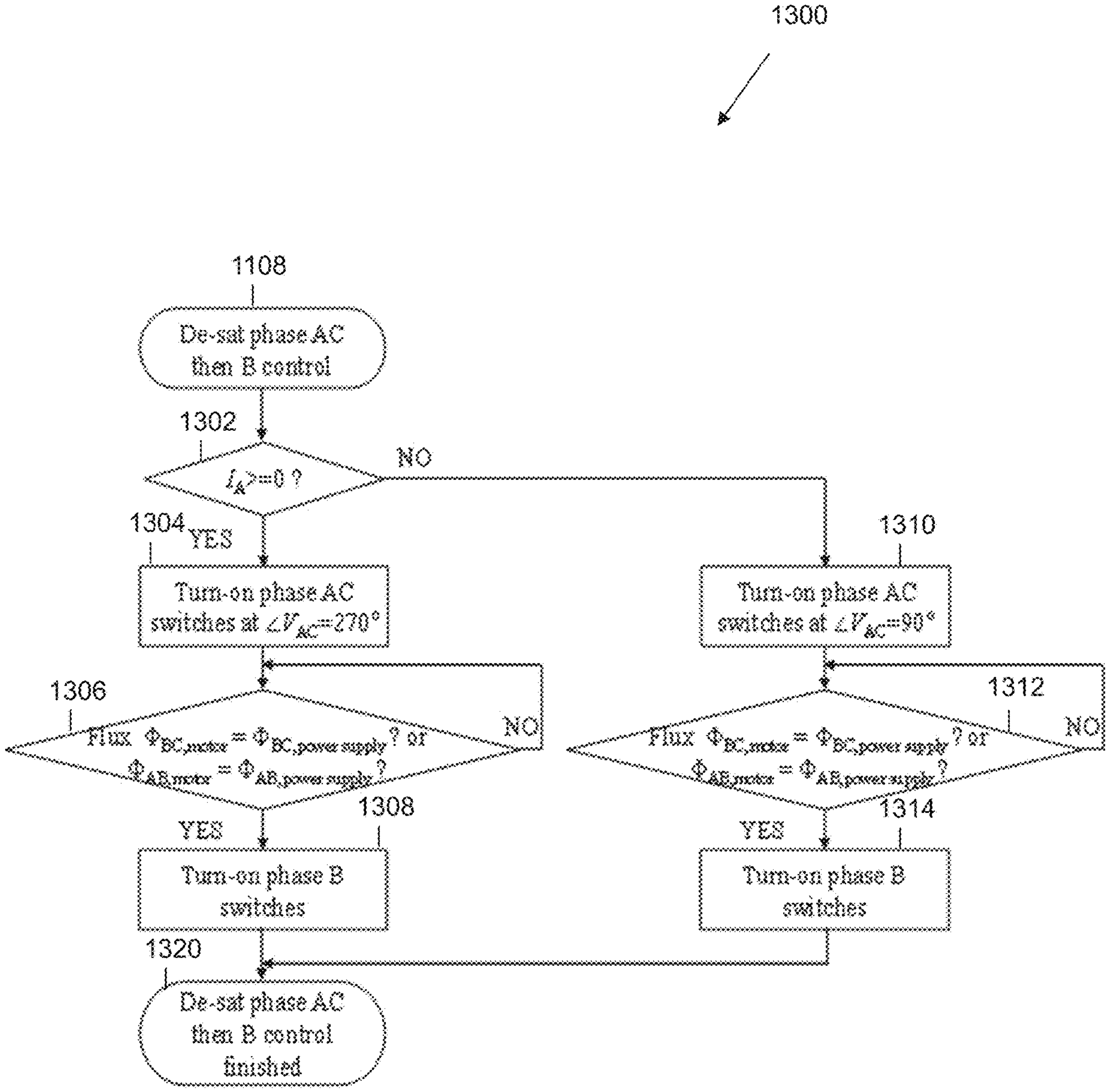
FIG. 13 illustrates an exemplary method for conducting motor flux de-saturation for a second sequence of phases according to embodiments of the present disclosure.

In FIG. 13, to conduct motor flux de-saturation, if the phase current of phase A is greater than the phase current of phase C, and the phase current of phase C is greater than the phase current of phase B, the fluxes associated with phase currents for phases AC can be de-saturated first and then the flux associated with the phase current for phase C can be de-saturated next. At block 1302, the method 1300 can include determining whether the phase current of A is greater than or equal to zero. If the phase current of A is greater than or equal to zero, the method 1300 can proceed to block 1304, which can include activating (or turning on) the phase AC switches at a first angle (e.g., $v_{AC}$ at 270°). Once the phase AC switches are activated at the first angle, the method 1300 can proceed to block 1306 where the method 1300 determines whether the flux $\varphi_{BC}$ of the motor is equal to the flux $\varphi_{BC}$ of the power supply, or the flux $\varphi_{AB}$ of the motor is equal to the flux $\varphi_{AB}$ of the power supply, whenever which of the phase-to-phase fluxes matched first. If neither match, the method 1300 continues to monitor until phase-to-phase fluxes match. If the flux $\varphi_{BC}$ of the motor is equal to the flux $\varphi_{BC}$ of the power supply, or the flux DAB of the motor is equal to the flux $\varphi_{AB}$ of the power supply, then the method 1300 can proceed to block 1308. At block 1308, the method 1300 an include activating the phase B switch of the controller 120. The method 1300 can then proceed to block 1320, which can finish the motor flux de-saturation process for phase AC and then B switches.

If, however, the phase current of A at block 1302 is less than zero (i.e., negative), the method 1300 can proceed from 1302 to 1310. Since the phase current of A is negative, the method 1300 can activate the phase AC switches at a second angle (e.g., $v_{AC}$ at 90°). The method 1300 can then proceed to block 1312, which can determine whether the flux $\varphi_{BC}$ of the motor is equal to the flux $\varphi_{BC}$ of the power supply, or the flux PAB of the motor is equal to the flux $\varphi_{AB}$ of the power supply, whenever which of the phase-to-phase fluxes matched first. If neither match, the method 1300 continues to monitor until phase-to-phase fluxes match. If the flux $\varphi_{BC}$ of the motor is equal to the flux $\varphi_{BC}$ of the power supply, or the flux $\varphi_{AB}$ of the motor is equal to the flux $\varphi_{AB}$ of the power supply, then the method 1300 can proceed to block 1314. At block 1314, the method 1300 can include activating the phase B switch of the controller 120. The method 1300 can then proceed to block 1320, which can finish the motor flux de-saturation process for phase AC and then B switches. Referring now back also to FIG. 11, the method 1100 can then proceed from block 1110 to block 1130, where the motor flux de-saturation control process is completed. Referring now also to FIG. 10, the method 1000 can then proceed to step 1018 and determine whether all the phase switches are activated, and, if so, proceeds to block 1020, where the motor start is finished and the motor 101 can continue to operate to perform a task at hand. In certain embodiments, block 1018 can be performed before block 1130.

Referring back now also to decision block 1108, if the absolute value of the phase current for phase A is not greater than the absolute value of the phase current for phase C, and the absolute value of the phase current for phase C is not greater than the absolute value of the phase current for phase B, the method 1100 can proceed to block 1112. At block 1112, the method 1000 can include determining whether the absolute value of the phase current for phase B is greater than the absolute value of the phase current for phase C, which is greater than the absolute value of the phase current for phase A. If the foregoing is true, the method 1100 can proceed to block 1114 by conducting a de-saturation process for phase BC and then A (e.g., If phase $|I_B|$>phase $|I_C|$>Phase $|I_A|$, then turn-on order is switching on phase BC first, then phase A). When proceeding to block 1114, additional sequences of operations or blocks can be conducted using method 1400, such as is shown in FIG. 14.

Figure 14:
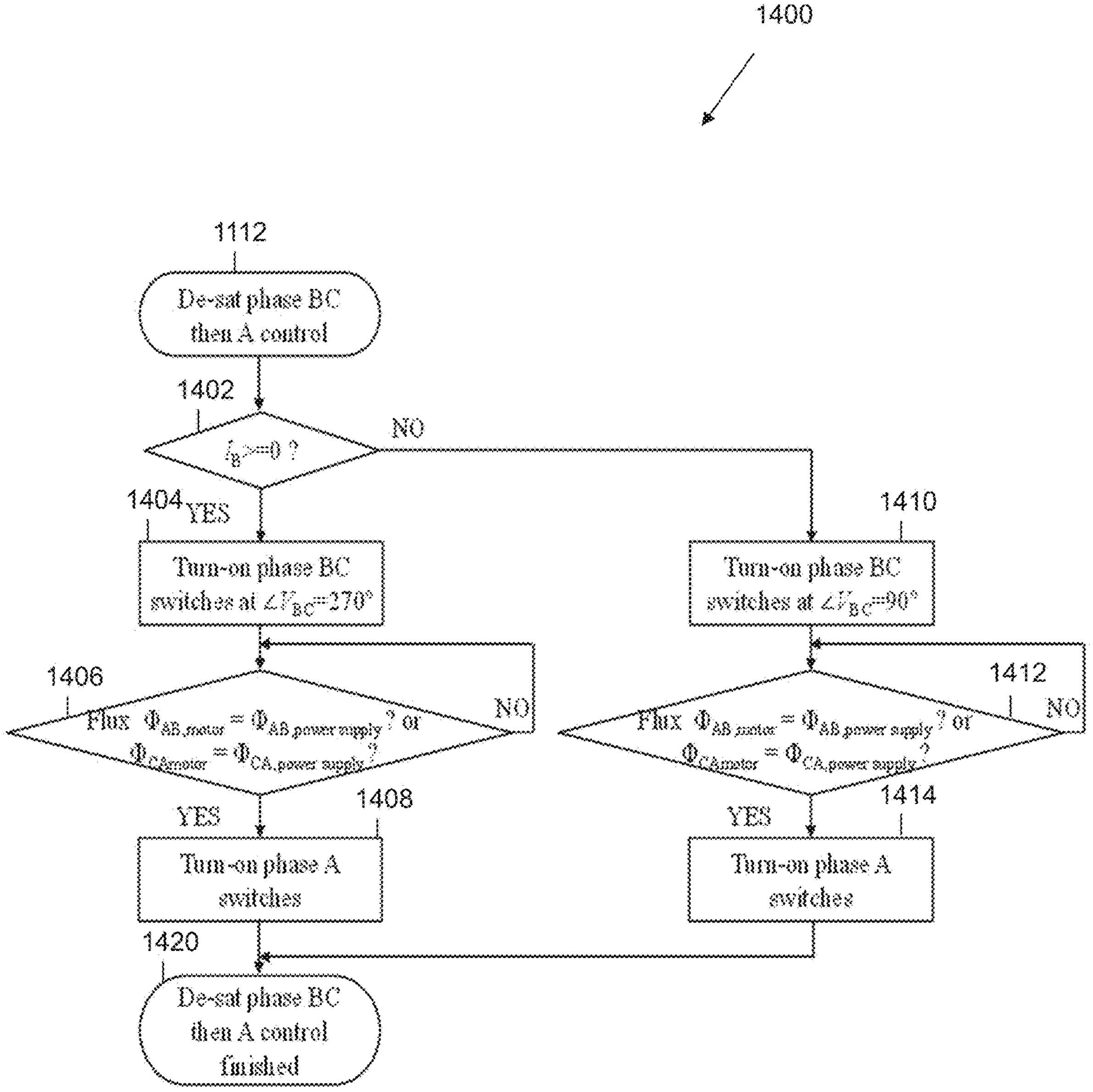
FIG. 14 illustrates an exemplary method for conducting motor flux de-saturation for a third sequence of phases according to embodiments of the present disclosure.

In FIG. 14, to conduct motor flux de-saturation, if the phase current of phase B is greater than the phase current of phase C, and the phase current of phase C is greater than the phase current of phase A, the fluxes associated with phase currents for phases BC can be de-saturated first and then the flux associated with the phase current for phase A can be de-saturated next. At block 1402, the method 1400 can include determining whether the phase current of B is greater than or equal to zero. If the phase current of B is greater than or equal to zero, the method 1400 can proceed to block 1404, which can include activating (or turning on) the phase BC switches at a first angle (e.g., $v_{BC}$ at 270°). Once the phase BC switches are activated at the first angle, the method 1400 can proceed to block 1406 where the method 1400 determines whether the flux $\varphi_{AB}$ of the motor is equal to the flux $\varphi_{AB}$ of the power supply, or the flux $\varphi_{CA}$ of the motor is equal to the flux $\varphi_{CA}$ of the power supply, whenever which of the phase-to-phase fluxes matched first. If neither match, the method 1400 continues to monitor until phase-to-phase fluxes match. If the flux $\varphi_{AB}$ of the motor is equal to the flux $\varphi_{AB}$ of the power supply, or the flux $\varphi_{CA}$ of the motor is equal to the flux $\varphi_{CA}$ of the power supply, then the method 1400 can proceed to block 1408. At block 1408, the method 1400 an include activating the phase A switch of the controller 120. The method 1400 can then proceed to block 1420, which can finish the motor flux de-saturation process for phase BC and then A switches.

If, however, the phase current of B at block 1402 is less than zero (i.e., negative), the method 1400 can proceed from 1402 to 1410. Since the phase current of B is negative, the method 1400 can activate the phase BC switches at a second angle (e.g., $v_{BC}$ at 90°). The method 1400 can then proceed to block 1412, which can determine whether the flux $\varphi_{AB}$ of the motor is equal to the flux $\varphi_{AB}$ of the power supply, or the flux $\varphi_{CA}$ of the motor is equal to the flux $\varphi_{CA}$ of the power supply, whenever which of the phase-to-phase fluxes matched first. If neither match, the method 1400 continues to monitor until phase-to-phase fluxes match. If the flux $\varphi_{AB}$ of the motor is equal to the flux $\varphi_{AB}$ of the power supply, or the flux $\varphi_{CA}$ of the motor is equal to the flux $\varphi_{CA}$ of the power supply, then the method 1400 can proceed to block 1414. At block 1414, the method 1400 can include activating the phase A switch of the controller 120. The method 1400 can then proceed to block 1420, which can finish the motor flux de-saturation process for phase BC and then A switches. Referring now back also to FIG. 11, the method 1100 can then proceed from block 1114 to block 1130, where the motor flux de-saturation control process is completed. Referring now also to FIG. 10, the method 1000 can then proceed to step 1018 and determine whether all the phase switches are activated, and, if so, proceeds to block 1020, where the motor start is finished and the motor 101 can continue to operate to perform a task at hand. In certain embodiments, block 1018 can be performed before block 1130.

Referring back now also to decision block 1112, if the absolute value of the phase current for phase B is not greater than the absolute value of the phase current for phase C, and the absolute value of the phase current for phase C is not greater than the absolute value of the phase current for phase A, the method 1100 can proceed to block 1116. At block 1116, the method 1000 can include determining whether the absolute value of the phase current for phase B is greater than the absolute value of the phase current for phase A, which is greater than the absolute value of the phase current for phase C. If the foregoing is true, the method 1100 can proceed to block 1118 by conducting a de-saturation process for phase BA and then C (e.g., If phase $|I_B|$>phase $|I_A|$>Phase $|I_C|$, then turn-on order is switching on phase BA first, then phase C. When proceeding to block 1118, additional sequences of operations or blocks can be conducted using method 1500, such as is shown in FIG. 15.

Figure 15:
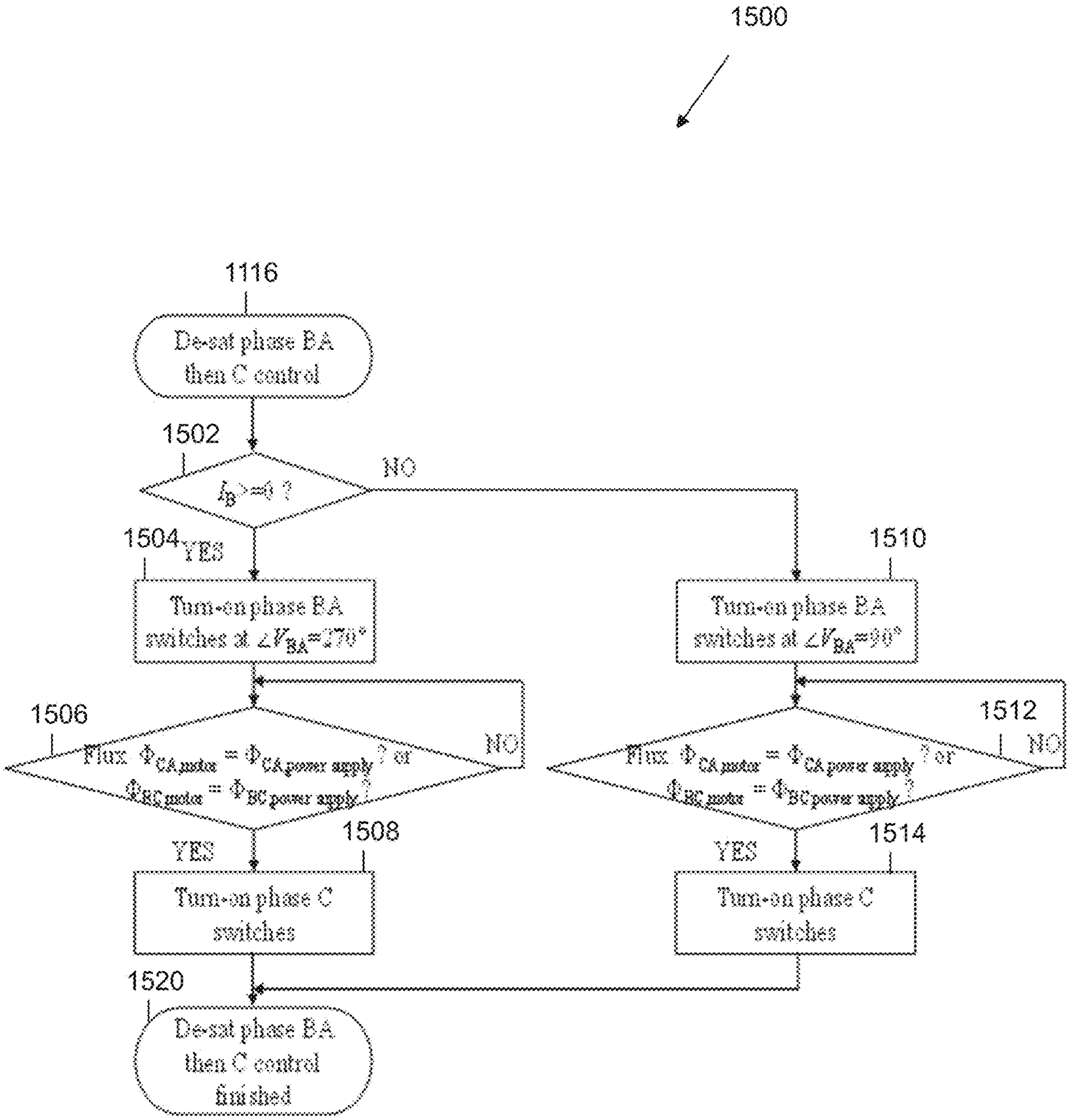
FIG. 15 illustrates an exemplary method for conducting motor flux de-saturation for a fourth sequence of phases according to embodiments of the present disclosure.

In FIG. 15, to conduct motor flux de-saturation, if the phase current of phase B is greater than the phase current of phase A, and the phase current of phase A is greater than the phase current of phase C, the fluxes associated with phase currents for phases BA can be de-saturated first and then the flux associated with the phase current for phase C can be de-saturated next. At block 1502, the method 1500 can include determining whether the phase current of B is greater than or equal to zero. If the phase current of B is greater than or equal to zero, the method 1500 can proceed to block 1504, which can include activating (or turning on) the phase BA switches at a first angle (e.g., VBA at 270°). Once the phase BA switches are activated at the first angle, the method 1500 can proceed to block 1506 where the method 1500 determines whether the flux $\varphi_{CA}$ of the motor is equal to the flux $\varphi_{CA}$ of the power supply, or the flux $\varphi_{BC}$ of the motor is equal to the flux $\varphi_{BC}$ of the power supply, whenever which of the phase-to-phase fluxes matched first. If neither match, the method 1500 continues to monitor until phase-to-phase fluxes match. If the flux OCA of the motor is equal to the flux $\varphi_{CA}$ of the power supply, or the flux $\varphi_{BC}$ of the motor is equal to the flux $\varphi_{BC}$ of the power supply, then the method 1500 can proceed to block 1508. At block 1508, the method 1500 an include activating the phase C switch of the controller 120. The method 1500 can then proceed to block 1520, which can finish the motor flux de-saturation process for phase BA and then C switches.

If, however, the phase current of B at block 1502 is less than zero (i.e., negative), the method 1500 can proceed from 1502 to 1510. Since the phase current of B is negative, the method 1500 can activate the phase BA switches at a second angle (e.g., VBA at 90°). The method 1500 can then proceed to block 1512, which can determine whether the flux $\varphi_{CA}$ of the motor is equal to the flux $\varphi_{CA}$ of the power supply, or the flux φBC of the motor is equal to the flux $\varphi_{BC}$ of the power supply, whenever which of the phase-to-phase fluxes matched first. If neither match, the method 1500 continues to monitor until phase-to-phase fluxes match. If the flux $\varphi_{CA}$ of the motor is equal to the flux $\varphi_{CA}$ of the power supply, or the flux $\varphi_{BC}$ of the motor is equal to the flux $\varphi_{BC}$ of the power supply, then the method 1500 can proceed to block 1514. At block 1514, the method 1500 can include activating the phase C switch of the controller 120. The method 1500 can then proceed to block 1520, which can finish the motor flux de-saturation process for phase BA and then C switches. Referring now back also to FIG. 11, the method 1100 can then proceed from block 1118 to block 1130, where the motor flux de-saturation control process is completed. Referring now also to FIG. 10, the method 1000 can then proceed to step 1018 and determine whether all the phase switches are activated, and, if so, proceeds to block 1020, where the motor start is finished and the motor 101 can continue to operate to perform a task at hand. In certain embodiments, block 1018 can be performed before block 1130.

Referring back now also to decision block 1116, if the absolute value of the phase current for phase B is not greater than the absolute value of the phase current for phase A, and the absolute value of the phase current for phase C is not greater than the absolute value of the phase current for phase A, the method 1100 can proceed to block 1120. At block 1120, the method 1000 can include determining whether the absolute value of the phase current for phase C is greater than the absolute value of the phase current for phase A, which is greater than the absolute value of the phase current for phase B. If the foregoing is true, the method 1100 can proceed to block 1122 by conducting a de-saturation process for phase CA and then B (e.g., If phase $|I_C|$>phase $|I_A|$>Phase $|I_B|$, then turn-on order is switching on phase CA first, then phase B. When proceeding to block 1122, additional sequences of operations or blocks can be conducted using method 1600, such as is shown in FIG. 16.

Figure 16:
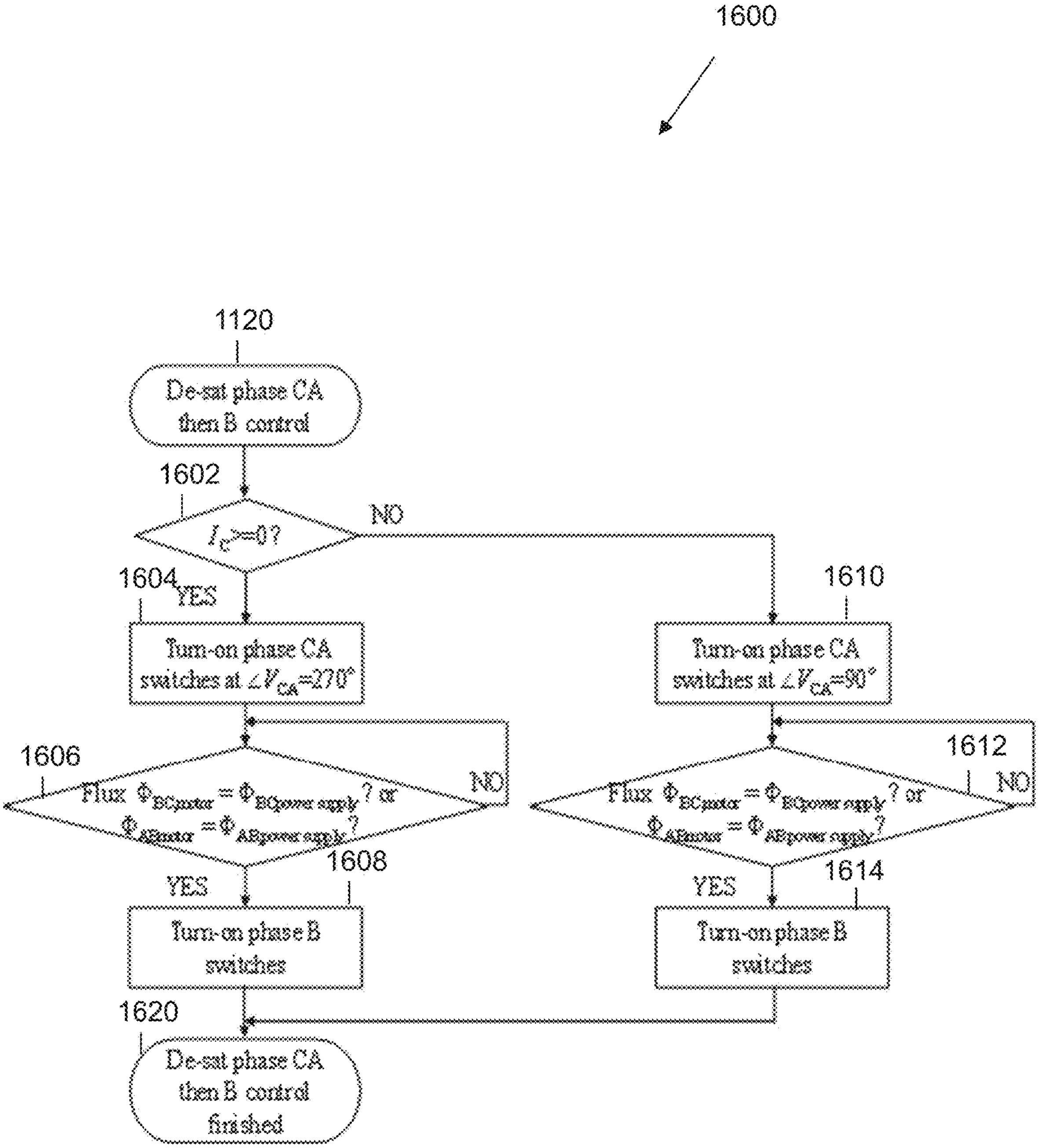
FIG. 16 illustrates an exemplary method for conducting motor flux de-saturation for a fifth sequence of phases according to embodiments of the present disclosure.

In FIG. 16, to conduct motor flux de-saturation, if the phase current of phase C is greater than the phase current of phase A, and the phase current of phase A is greater than the phase current of phase B, the fluxes associated with phase currents for phases CA can be de-saturated first and then the flux associated with the phase current for phase B can be de-saturated next. At block 1602, the method 1600 can include determining whether the phase current of C is greater than or equal to zero. If the phase current of C is greater than or equal to zero, the method 1600 can proceed to block 1604, which can include activating (or turning on) the phase CA switches at a first angle (e.g., $v_{CA}$ at 270°). Once the phase CA switches are activated at the first angle, the method 1600 can proceed to block 1606 where the method 1600 determines whether the flux $\varphi_{BC}$ of the motor is equal to the flux $\varphi_{BC}$ of the power supply, or the flux $\varphi_{AB}$ of the motor is equal to the flux $\varphi_{AB}$ of the power supply, whenever which of the phase-to-phase fluxes matched first. If neither match, the method 1600 continues to monitor until phase-to-phase fluxes match. If the flux $\varphi_{BC}$ of the motor is equal to the flux $\varphi_{BC}$ of the power supply, or the flux $\varphi_{AB}$ of the motor is equal to the flux $\varphi_{AB}$ of the power supply, then the method 1600 can proceed to block 1608. At block 1608, the method 1600 an include activating the phase B switch of the controller 120. The method 1600 can then proceed to block 1620, which can finish the motor flux de-saturation process for phase CA and then B switches.

If, however, the phase current of C at block 1602 is less than zero (i.e., negative), the method 1600 can proceed from 1602 to 1610. Since the phase current of C is negative, the method 1600 can activate the phase CA switches at a second angle (e.g., $v_{CA}$ at 90°). The method 1600 can then proceed to block 1612, which can determine whether the flux $\varphi_{BC}$ of the motor is equal to the flux $\varphi_{BC}$ of the power supply, or the flux PAB of the motor is equal to the flux $\varphi_{AB}$ of the power supply, whenever which of the phase-to-phase fluxes matched first. If neither match, the method 1600 continues to monitor until phase-to-phase fluxes match. If the flux $\varphi_{BC}$ of the motor is equal to the flux $\varphi_{BC}$ of the power supply, or the flux $\varphi_{AB}$ of the motor is equal to the flux $\varphi_{AB}$ of the power supply, then the method 1600 can proceed to block 1614. At block 1614, the method 1600 can include activating the phase B switch of the controller 120. The method 1600 can then proceed to block 1620, which can finish the motor flux de-saturation process for phase CA and then B switches. Referring now back also to FIG. 11, the method 1100 can then proceed from block 1122 to block 1130, where the motor flux de-saturation control process is completed. Referring now also to FIG. 10, the method 1000 can then proceed to step 1018 and determine whether all the phase switches are activated, and, if so, proceeds to block 1020, where the motor start is finished and the motor 101 can continue to operate to perform a task at hand. In certain embodiments, block 1018 can be performed before block 1130.

Referring back now also to decision block 1120, if the absolute value of the phase current for phase C is not greater than the absolute value of the phase current for phase A, and the absolute value of the phase current for phase A is not greater than the absolute value of the phase current for phase B, the method 1100 can proceed to block 1124. At block 1124, the method 1000 can include determining whether the absolute value of the phase current for phase C is greater than the absolute value of the phase current for phase B, which is greater than the absolute value of the phase current for phase A. If the foregoing is true, the method 1100 can proceed to block 1126 by conducting a de-saturation process for phase CB and then A (e.g., If phase $|I_C|$>phase |/B|>Phase $|I_A|$, then turn-on order is switching on phase CB first, then phase A. When proceeding to block 1126, additional sequences of operations or blocks can be conducted using method 1700, such as is shown in FIG. 17.

Figure 17:
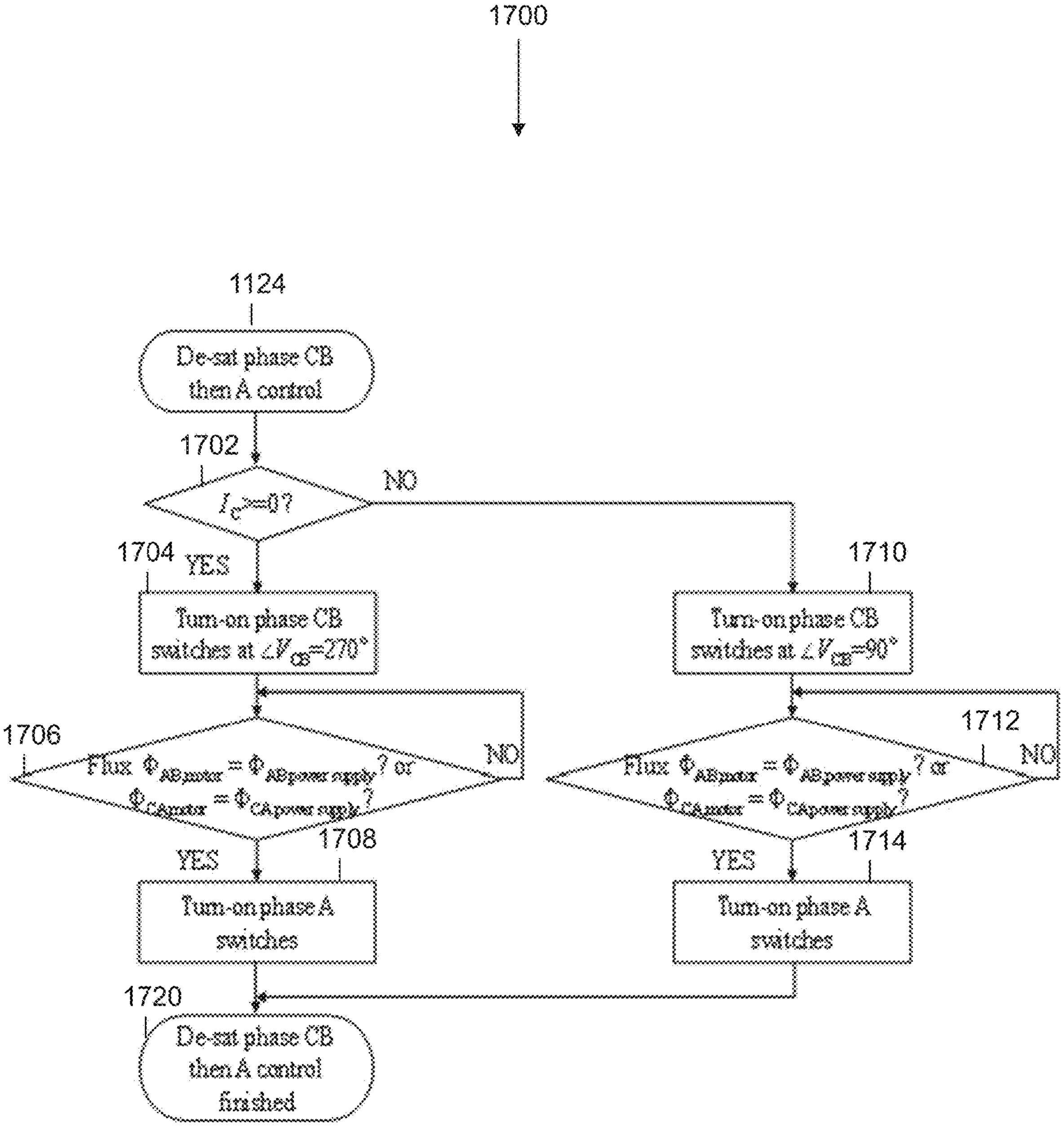
FIG. 17 illustrates an exemplary method for conducting motor flux de-saturation for a sixth sequence of phases according to embodiments of the present disclosure.

In FIG. 17, to conduct motor flux de-saturation, if the phase current of phase C is greater than the phase current of phase B, and the phase current of phase B is greater than the phase current of phase A, the fluxes associated with phase currents for phases CB can be de-saturated first and then the flux associated with the phase current for phase A can be de-saturated next. At block 1702, the method 1700 can include determining whether the phase current of C is greater than or equal to zero. If the phase current of C is greater than or equal to zero, the method 1700 can proceed to block 1704, which can include activating (or turning on) the phase CB switches at a first angle (e.g., $v_{CB}$ at 270°). Once the phase CB switches are activated at the first angle, the method 1700 can proceed to block 1706 where the method 1700 determines whether the flux $\varphi_{AB}$ of the motor is equal to the flux $\varphi_{AB}$ of the power supply, or the flux OCA of the motor is equal to the flux $\varphi_{CA}$ of the power supply, whenever which of the phase-to-phase fluxes matched first. If neither match, the method 1700 continues to monitor until phase-to-phase fluxes match. If the flux $\varphi_{AB}$ of the motor is equal to the flux $\varphi_{AB}$ of the power supply, or the flux $\varphi_{CA}$ of the motor is equal to the flux $\varphi_{CA}$ of the power supply, then the method 1700 can proceed to block 1708. At block 1708, the method 1700 an include activating the phase A switch of the controller 120. The method 1700 can then proceed to block 1720, which can finish the motor flux de-saturation process for phase CB and then A switches.

If, however, the phase current of C at block 1702 is less than zero (i.e., negative), the method 1700 can proceed from 1702 to 1710. Since the phase current of C is negative, the method 1700 can activate the phase CB switches at a second angle (e.g., $v_{CB}$ at 90°). The method 1700 can then proceed to block 1712, which can determine whether the flux $\varphi_{AB}$ of the motor is equal to the flux $\varphi_{AB}$ of the power supply, or the flux $\varphi_{CA}$ of the motor is equal to the flux $\varphi_{CA}$ of the power supply, whenever which of the phase-to-phase fluxes matched first. If neither match, the method 1700 continues to monitor until phase-to-phase fluxes match. If the flux $\varphi_{AB}$ of the motor is equal to the flux CAB of the power supply, or the flux $\varphi_{CA}$ of the motor is equal to the flux $\varphi_{CA}$ of the power supply, then the method 1700 can proceed to block 1714. At block 1714, the method 1600 can include activating the phase A switch of the controller 120. The method 1700 can then proceed to block 1720, which can finish the motor flux de-saturation process for phase CB and then A switches. Referring now back also to FIG. 11, the method 1100 can then proceed from block 1126 to block 1130, where the motor flux de-saturation control process is completed. Referring now also to FIG. 10, the method 1000 can then proceed to step 1018 and determine whether all the phase switches are activated, and, if so, proceeds to block 1020, where the motor start is finished and the motor 101 can continue to operate to perform a task at hand. In certain embodiments, block 1018 can be performed before block 1130.

Depending on which motor flux de-saturation process is used depending on the phase currents and fluxes generated therefrom (e.g., the processes shown in FIGS. 12-17 for various possibilities), the de-saturation process can limit the inrush current provided to the motor 101 in an effective manner, while simultaneously reducing stresses, such as thermal stresses on the components of the motor 101 and/or system 100. The method 1100 can proceed to block 1130 and complete the motor flux de-saturation control process. Then for the main method 1000, the method 1000 can proceed to block 1020 and complete the motor start process and let the motor continue to operate to perform a particular task. In certain embodiments, the methods 1000, 1100, 1200, 1300, 1400, 1500, 1600, and 1700 can be repeated each time the motor 101 is started or at any other desired sequence to ensure that the motor 101 inrush current is limited and the components experience reduced potential and/or actual stresses.

Figure 18:
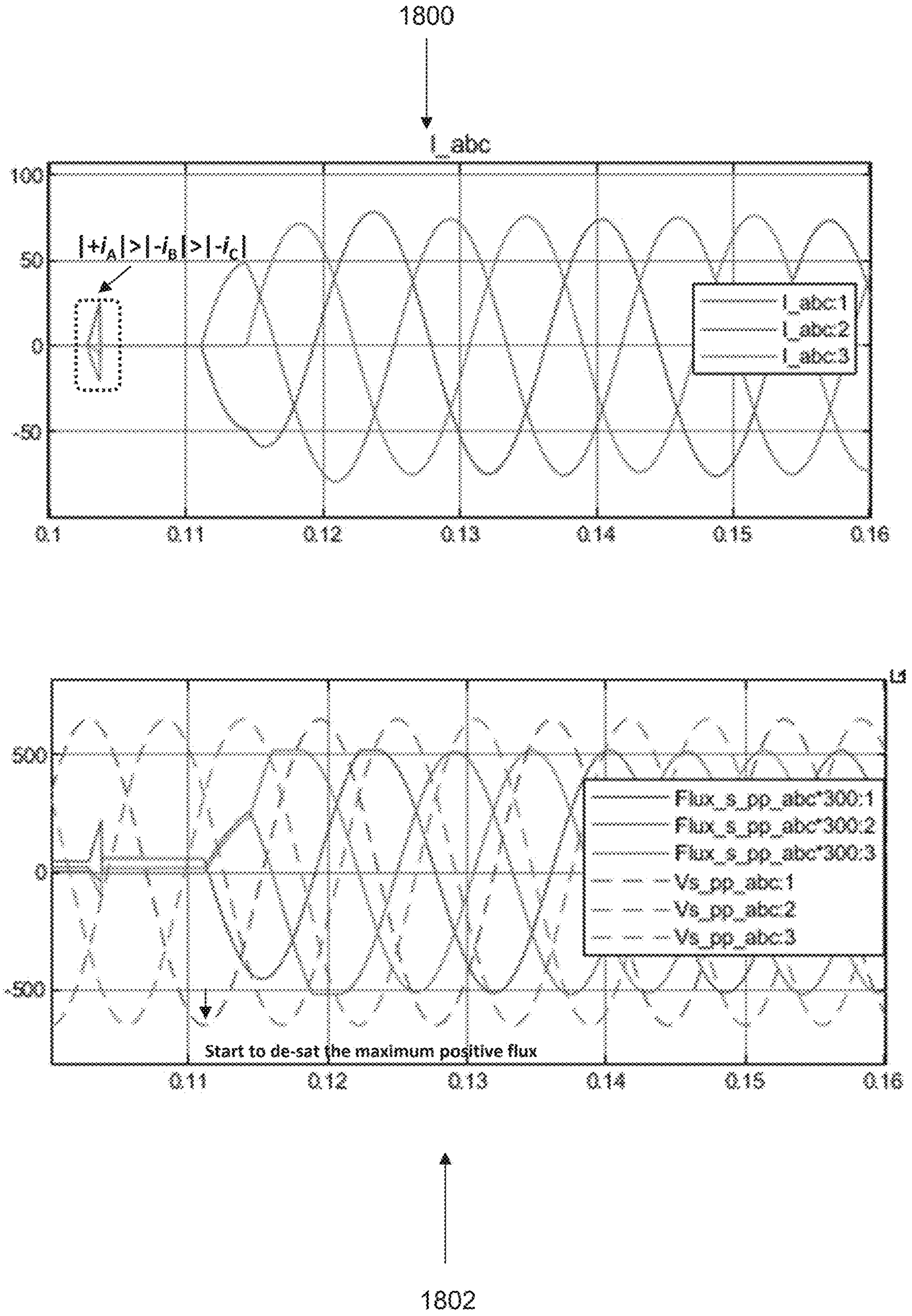
FIG. 18 illustrates graphs featuring three-phase current of a motor and power supply three-phase flux and voltage according to embodiments of the present disclosure.
Figure 19:
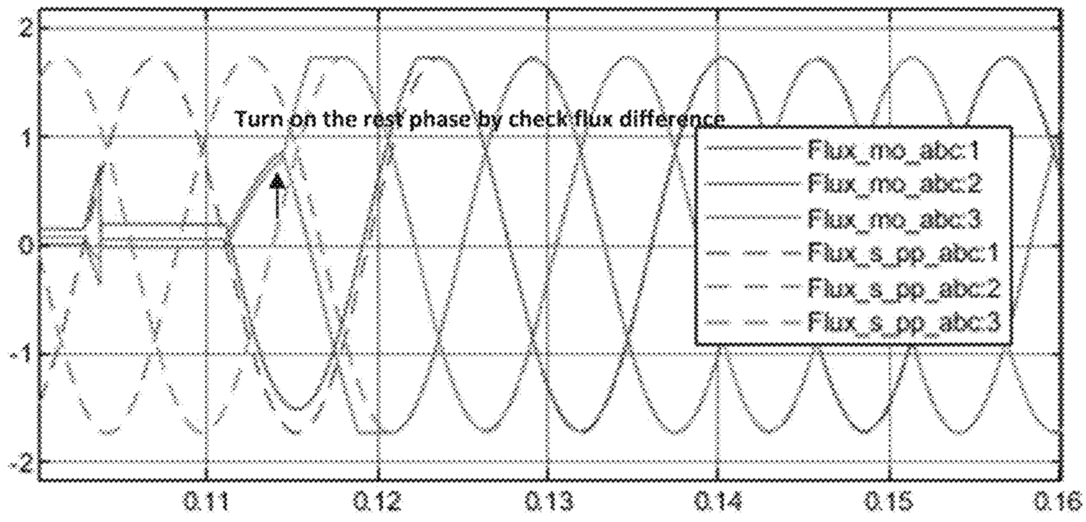
FIG. 19 illustrates graphs featuring three-phase flux of a motor and power supply and motor root mean square current during starting control according to embodiments of the present disclosure.
Figure 19:
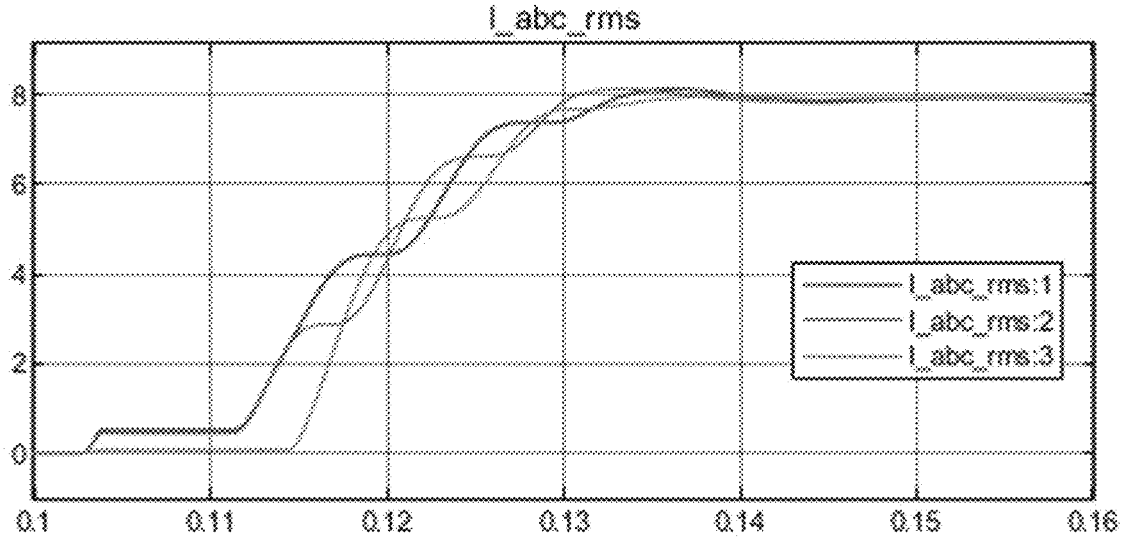
Figure 20:
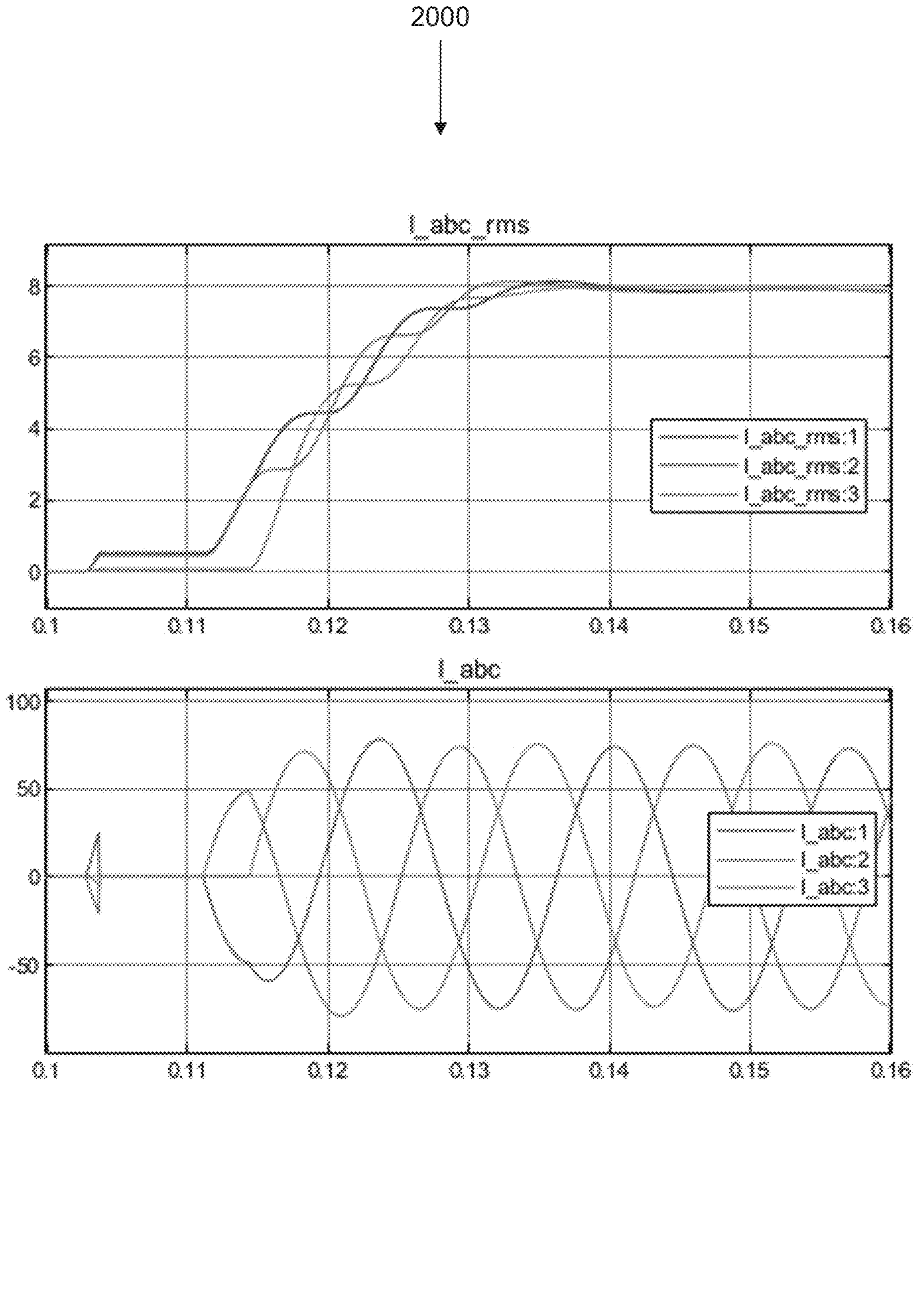
FIG. 20 illustrates graphs featuring a motor with residual flux according to embodiments of the present disclosure.
Figure 21:
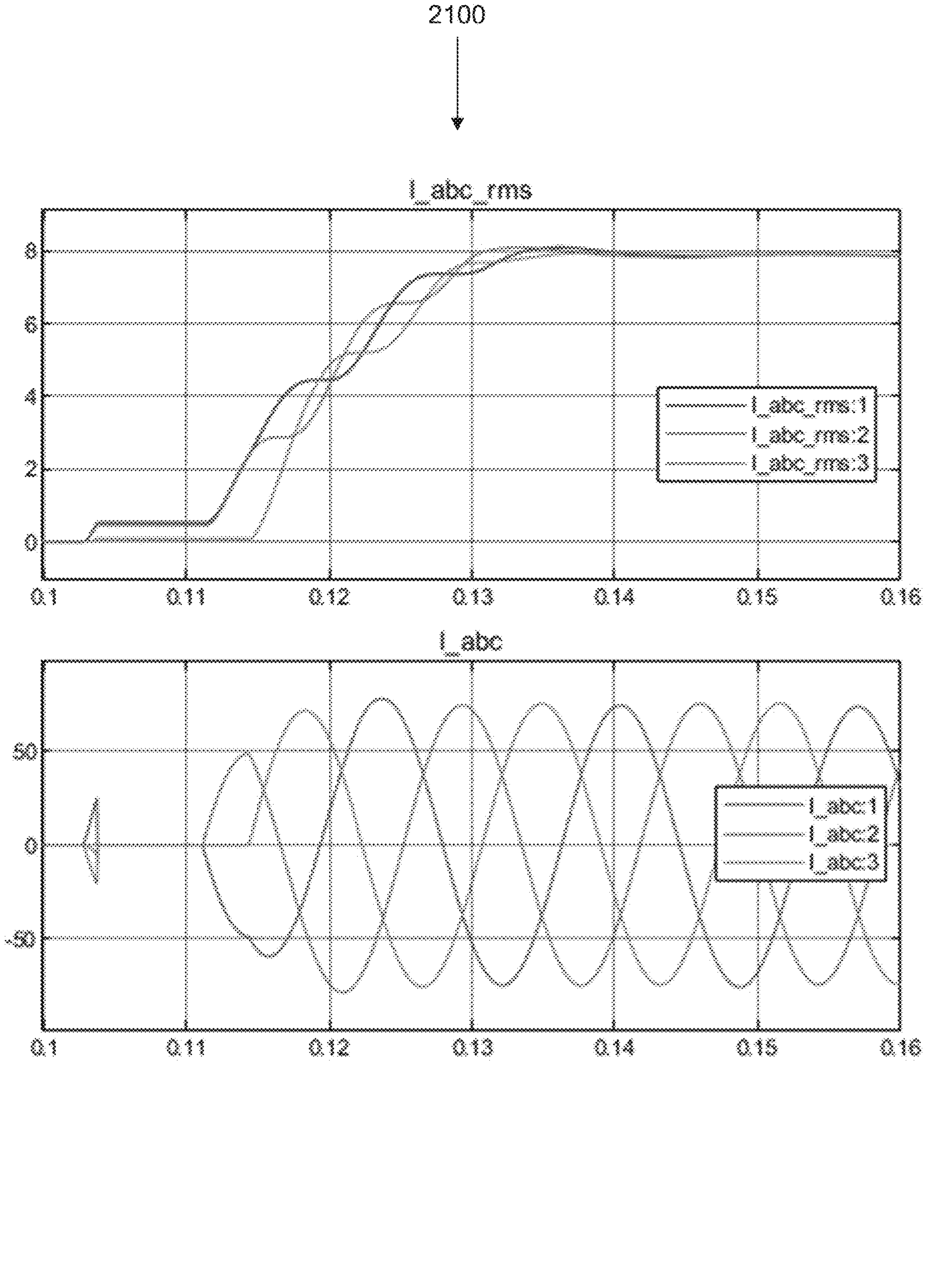
FIG. 21 illustrates graphs featuring a motor without residual flux according to embodiments of the present disclosure.

Referring now also to FIG. 18, exemplary graphs 1800 and 1802 illustrate the three-phase current of a motor 101 and the power supply (i.e., voltage source 102) three-phase flux (i.e., solid line) and voltage (dash line) during use of a pre-start controller. In graph 1800, the x-axis is time in seconds and the y-axis is the current. Currents for the three-phases are illustrated in graph 1800. In graph 1800, the current threshold is shown as 20A, and when the phase current reaches 20 A, all three phase switches turn off at the same time. In this example, because $|+i_A|>|-i_B|>|-i_C|$, then turn-on order should be AB then C. Since $i_A$ is positive, then the turn-on timing is voltage $v_{AB}$ at 270° as shown in 1802. In graph 1802, the x-axis is also time in seconds and the power supply three-phase flux and associated voltages are illustrated. Additionally, in graph 1802, an exemplary indicator is shown, which indicates the time at which the de-saturation process for de-saturating the highest maximum positive flux of the three phases can be started or initiated. Referring now also to FIG. 19, exemplary graphs 1900 and 1902 illustrate the three-phase flux of the motor (i.e., solid line) and power supply (dash line) and the motor rms current in p.u. during starting control using the pre-start controller. In graph 1900, the three-phase flux of the motor and flux of the power supply (i.e., the voltage source 102) is shown and the x-axis is time in seconds. The rest switches for controlling phase C turns on when flux difference between power supply and motor is within acceptable range as shown in graph 1900. In graph 1902, the motor rms current in p.u. during the starting control provided by the pre-start controller is shown, and the x-axis is time in seconds. Referring now also to FIGS. 20 and 21, example graphs 2000, 2100 of simulations are shown where a pre-start controller is utilized with an induction motor with or without residual flux. In graph 2000, the motor rms current in p.u. is shown in the top graph of graph 2000 for a motor with residual flux, 10% of the nominal flux. The bottom graph of graph 2000 illustrates the motor current with residual flux, 10% of nominal flux. In graph 2100, the motor rms current in p.u. is shown in the top graph of graph 2100 for a motor without residual flux, and the bottom graph of graph 2100 illustrates the motor current without residual flux.

Figure 22:
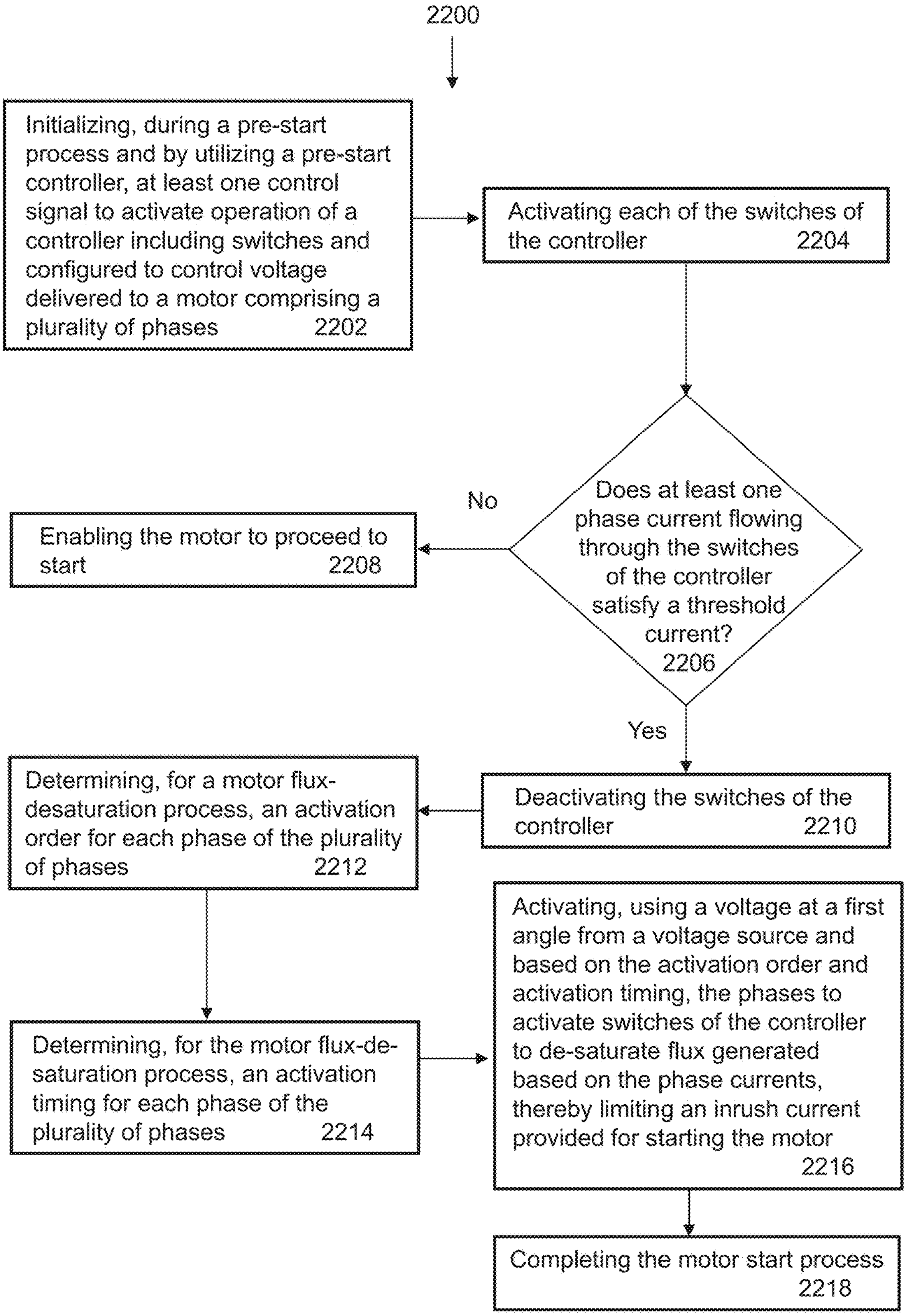
FIG. 22 illustrates an exemplary method for providing inrush current limiting for a start process for a motor according to embodiments of the present disclosure.
Figure 23:
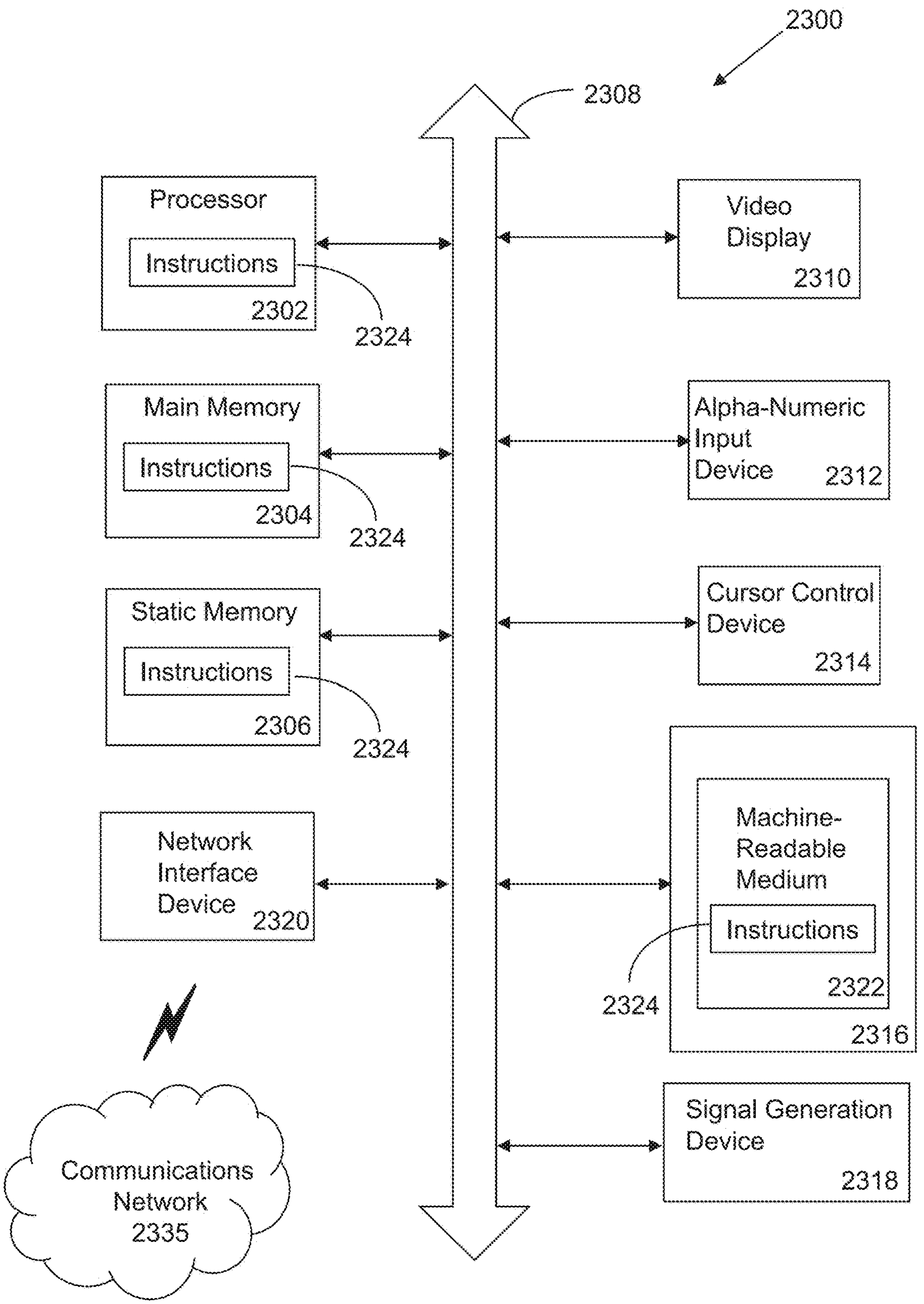
FIG. 23 illustrates a schematic diagram of a machine in the form of a computer system within which a set of instructions, when executed, can cause the machine to facilitate inrush current limiting during a start process for a motor according to embodiments of the present disclosure.

Referring now also to FIG. 22, an exemplary method 2200 for providing inrush current limiting for motor starting according to embodiments of the present disclosure is provided. In certain embodiments, the method 1100 can be implemented by utilizing the system 100 and/or motor 101. In certain embodiments, the method of FIG. 22 can be implemented in the system 2300 of FIG. 23 and/or any other systems, devices, and/or componentry illustrated in the Figures. In certain embodiments, the method 2200 can be implemented by utilizing a combination of the system 100, the motor 101, the system 2300, and/or any other systems. In certain embodiments, the method of FIG. 22 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In certain embodiments, the method of FIG. 22 can be performed at least in part by one or more processing devices (e.g., processor 2302 of FIG. 23, a processor of pre-start controller 130, a processor of solid-state controller 120, and/or any other processor) and/or other devices, systems, components, or a combination thereof, of FIGS. 1-23. Although shown in a particular sequence or order, unless otherwise specified, the order of the operations in the method 2300 can be modified and/or changed depending on implementation and objectives. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible. For example, in certain embodiments, the method 2300 can be combined with other methods. In certain embodiments, a greater or fewer number of operations as illustrated in FIG. 23 can be incorporated into method 2300. In certain embodiments, the method 2300 can be modified to incorporate any of the functionality described in the present disclosure.

Generally, the method 2200 can include operations, actions, or blocks for limiting inrush currents during a motor startup process according to embodiments of the present disclosure. For example, in certain embodiments, the method 2200 can include, at block 2202, initializing, such as during a pre-start process and by utilizing a pre-start controller of a system 100 including a motor 101, a control signal(s) to activate operation of a controller 120 (e.g., a solid-state controller) including a plurality of switches (e.g., semiconductor switches). In certain embodiments, for example, the control signals and/or motor start command can be initiated via a button of the motor 101, the pre-start controller 130, the controller 120, a toggle switch of the motor 101, a remote control system (e.g., system 2300), a soft starter, a control panel interface of the motor 101 and/or system 100, any other input mechanism, or a combination thereof. In certain embodiments, the motor start command and/or control signals can be utilized to activate or initiate operation of the motor 101. In certain embodiments, the method 2200 can also include checking a motor status of the motor 101 to ensure that there is no fault or malfunction with the motor 101 and/or the voltage source 102 (e.g., the power supply to the motor 101), such as by utilizing the pre-start controller 130.

At block 2204, the method 2200 can include activating each of the switches (e.g., semiconductor switches) of the controller 120. In certain embodiments, the controller 120 can be a three-phase controller or any phase controller. In certain embodiments, the activating can be performed by utilizing the pre-start controller 130, which can transmit a signal or command to the controller 120 to initiate the activation. In certain embodiments, during activation, the voltage source 102 can supply voltage to generate phase currents for each of the phases (e.g., wires, windings, or phase A, B, C) connected to the motor 101. In certain embodiments, for example, each phase can carry an alternating current this is 120 degrees out of phase with the other two phases, thereby providing a balanced power supply that allows the motor 101 to efficiently operate with consistent and constant torque. At block 2206, the method 2200 can include determining whether at least one of the phase currents for each of the phases flowing through the switches of the controller 120 satisfies a threshold current. In certain embodiments, the threshold current value can be provided to the pre-start controller 130, such as via a signal from the system 100, a device (e.g., a component of system 2300), via an input received via an interface of the motor 101, or a combination thereof. In certain embodiments, if none of the phase currents for each of the phases flowing through the switches of the controller 120 satisfies the threshold current, the method 2300 can proceed to block 2208, which can include enabling the motor to proceed through the start process and allow the motor to operate for a particular task without having to conduct inrush current limiting.

If, however, at block 2206, one or more of the phase currents satisfies the threshold current value, the method 2200 can proceed to block 2210. At block 2210, the method 2200 can include deactivating each of the switches of the controller 120. In certain embodiments, the system 100 can save the current (i.e., the three-phase current), such by utilizing a variable frequency drive, DOL starter component, programmable logic controllers, soft starters, memory devices, and/or other types of devices and/or components. As an example, the threshold current can be two times the nominal current, three times the nominal current, or other desired values. In certain embodiments, the threshold current can depend on the controller current rating, current sensor accuracy (e.g., for sensors in the controller 120 and/or pre-start controller 130 that can sense and measure currents flowing through the wires, windings, switches, and/or the system 100) and voltage stress to the switches, such as when turned off. From block 2210, the method 2200 can proceed to block 2212. At block 2212, the method 2200 can include determining, for a motor-flux desaturation process, an activation order for each phase of the plurality of phases for the motor 101 and which are connected to the controller 120. For example, in certain embodiments, in order to determine the activation order for each phase, the method 2200 can include determining the absolute values for each of the phase currents for each of the phases. The phase currents, for example, can be negative or positive and taking the absolute value of either the negative or positive current will facilitate determining of the correct activation order to facilitate limitation of inrush current that is generated by the voltage source 102 when starting the motor 101. In certain embodiments, the corresponding flux generated by the highest phase current would need to be limited or suppressed first by the system 100 (e.g., via the pre-controller 130) to facilitate reduction of the inrush current utilized to start the motor 101. The corresponding flux generated by the second highest phase current can be limited or suppressed together with or, in certain embodiments, after the highest flux, and the third highest (or lowest of the three) flux generated by the third highest (or lowest) current can be suppressed or limited last. For example, if the highest flux generated by the highest phase current corresponded to phase A and the second highest flux generated by the second highest phase current corresponding to phase B, then phase A would be higher (or earlier) in the activation order than phase B. If phase C has the third highest flux generated by the lowest phase current, then phase C can be the lowest (or last) in the activation order.

Once the activation order for each phase of the plurality of phases for the motor 101 is determined, the method 2200 can proceed to block 2214. At block 2214, the method 2200 can include determining, for the motor flux de-saturation process, an activation timing for each phase of the plurality of phases. In certain embodiments, the angle of flux can be 90° delayed when compared with the voltage. In certain embodiments, the 270° voltage can be used to de-saturate the highest positive flux and the 90° voltage can be used to de-saturate the highest negative flux. Using the example above, if the phase A phase current is positive, then phases AB can be turned on when the power supply voltage $v_{AB}$ is at 270°. If, however, the phase A current is negative, then the phases AB can be turned on when the voltage source 102 (i.e., the power supply) power supply voltage $v_{AB}$ is at 90°. In certain embodiments, the third phase C can be turned on when the flux $\varphi_{CA}$ of the motor is equal to the flux $\varphi_{CA}$ of the power supply, or the flux $\varphi_{BC}$ of the motor is equal to the flux $\varphi_{BC}$ of the power supply, whenever which of the phase-to-phase fluxes matched first. Based on the foregoing, the method 2200, at block 2216, can include activating, using a voltage at a first angle from the voltage source 102 and based on the activation order and activation timing, the phases to activate the switches of the controller 120 to de-saturate the flux generated based on the phase currents, thereby limiting the inrush current provided for starting the motor 101. In certain embodiments, at block 2218, the method 200 can include completing the motor start process and letting the motor 101 continue to operate for a specific task.

In certain embodiments, the method 2200 can be repeated as desired, which can be on a continuous basis, periodic basis, or at designated times. Notably, the method 2200 can incorporate any of the other functionality as described herein and can be adapted to support the functionality of the system 100, the motor 101, the controller 120, the pre-start controller 130, and/or other components described in the present disclosure. In certain embodiments, functionality of the method 2200 can be combined with other methods and/or functionality described in the present disclosure. In certain embodiments, certain operations of the method 2200 can be replaced with other functionality of the present disclosure and the sequence of operations can be adjusted as desired.

In certain embodiments, the features and functionality provided by the pre-start controller 130, system 100, and methods can be utilized to provide inrush current reduction control effective for both common induction motors and high efficiency motors, limitation of high inrush and magnetization currents without interference of the operation of the motor 101, increased power density and reduce cost of solid-state controllers for motor application, universal control for wide range mechanical load and HP of induction motors, starting current reduction in wide range of mechanical load and HP of induction motors, and reduction of the motor DOL starting inrush current to avoid voltage perturbations in the system, reduction of power quality, and cable overloads. In certain embodiments, the features and functionality of the present disclosure provide a control circuit that control the semiconductor devices of a solid-state motor controller to reduce the starting flux of the induction motor machine. In certain embodiments, the first time switching on/off the phase current can be utilized to determine the flux direction of motor. In certain embodiments, the second time switching on the phase current is controlled can be to de-saturate the flux of motor, thus limit the starting current. In certain embodiments, control algorithms are provided that can limit the inrush current of wide range of horsepower motors 101. Still further, control algorithms are provided that can limit the inrush and starting current of a line started motor to a reasonable value in order not to exceed inrush current standard requirements for motors, especially high efficiency motors Referring now also to FIG. 23, at least a portion of the methodologies and techniques described with respect to the exemplary embodiments of the system 100 and/or methods can incorporate a machine, such as, but not limited to, computer system 2300, or other computing device within which a set of instructions, when executed, can cause the machine to perform any one or more of the methodologies or functions discussed above. The machine can be configured to facilitate various operations conducted by the motor 101, the voltage source 102, the solid-state controller 120, the pre-start controller 130, any other components and/or devices of the present disclosure, or a combination thereof. In certain embodiments, the computer system 2300 can be configured to facilitate and/or perform any of the operations and/or functionality described in the present disclosure. For example, the machine can be configured to, but is not limited to, assist the system 100 initializing circuit status and control signals for the solid-state controller 120, activating semiconductor switches of the controller 120, monitoring phase currents associated with each phase of the motor 101, deactivating the switches of the controller 120, executing motor de-saturation control to reduce flux generated during startup of the motor 120, initiating soft-start controls for a motor 120, or by assisting with any other operations conducted by or within the system 1000. As another example, in certain embodiments, the computer system 2300 can assist in conducting current measurement and signal conditioning for the system 100, receiving and/or transmitting communication signals between the components of the system 100, controlling any of the devices of the system 100, performing any other functionality described in the present disclosure, or a combination thereof. In certain embodiments, the computer system 2300 can be configured to assist in facilitating communications between motors 101, controller 120, pre-start controller 130, and/or communication networks 2335, performing any other operations, or a combination thereof.

In some embodiments, the machine can operate as a standalone device. In some embodiments, the machine can be connected (e.g., using communications network 2335, another network, or a combination thereof) to and assist with operations performed by other machines and systems, such as, but not limited to, the communications network 2335, the motors 101, the controller 120, the pre-start controller 130, the voltage source 102, any other system, program, and/or device, or any combination thereof. The machine can be connected with any component in the system 100. In a networked deployment, the machine can operate in the capacity of a server or a client user machine in a server-client user network environment, or as a peer machine in a peer-to-peer (or distributed) network environment. The machine can comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 2300 can include a processor 2302 (e.g., a central processing unit (CPU), a graphics processing unit (GPU, or both), a main memory 2304 and a static memory 2306, which communicate with each other via a bus 2308. The computer system 2300 can further include a video display unit 2310, which can be, but is not limited to, a liquid crystal display (LCD), a flat panel, a solid-state display, or a cathode ray tube (CRT). The computer system 2300 can include an input device 2312, such as, but not limited to, a keyboard, a cursor control device 2314, such as, but not limited to, a mouse, a disk drive unit 2316, a signal generation device 2318, such as, but not limited to, a speaker or remote control, and a network interface device 2320.

The disk drive unit 2316 can include a machine-readable medium 2322 on which is stored one or more sets of instructions 2324, such as, but not limited to, software embodying any one or more of the methodologies or functions described herein, including those methods illustrated above. The instructions 2324 can also reside, completely or at least partially, within the main memory 2304, the static memory 2306, or within the processor 2302, or a combination thereof, during execution thereof by the computer system 2300. The main memory 2304 and the processor 2302 also can constitute machine-readable media.

Dedicated hardware implementations including, but not limited to, application specific integrated circuits, programmable logic arrays and other hardware devices can likewise be constructed to implement the methods described herein. Applications that can include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 2322 containing instructions 2324 so that a device connected to the communications network 2335, another network, or a combination thereof, can send or receive voice, video or data, and communicate over the communications network 1035, another network, or a combination thereof, using the instructions. The instructions 2324 can further be transmitted or received over the communications network 2335, another network, or a combination thereof, via the network interface device 2320.

While the machine-readable medium 2322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" can be non-transitory, and, in certain embodiments, cannot include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements can be utilized and derived therefrom, such that structural and logical substitutions and changes can be made without departing from the scope of this disclosure. Figures are also merely representational and cannot be drawn to scale. Certain proportions thereof can be exaggerated, while others can be minimized. Accordingly, the specification and drawings are to be regarded in an illustrative rather than a restrictive sense.

Thus, although specific arrangements have been illustrated and described herein, it should be appreciated that any arrangement calculated to achieve the same purpose can be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure is not limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and can be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

At least some aspects of the present disclosure will now be described with reference to the following numbered clauses.

Clause 1: A system for providing inrush current limiting for a motor, such an induction motor can include; a voltage source configured to provide voltage; a motor comprising a plurality of phases; a controller comprising a plurality of switches and configured to control the voltage delivered to the motor by the voltage source; and a pre-start controller configured to initialize, during a pre-start process, at least one control signal to activate operation of the controller; activate each switch of the plurality of switches of the controller; determine whether at least one phase current flowing through the plurality of switches of the controller satisfies a threshold current; deactivate, based on the at least one phase current flowing through the at least one switch satisfying the threshold current, the plurality of switches of the controller; determine, for a motor flux de-saturation process, an activation order for each phase of the plurality of phases, wherein a first phase of the plurality of phases having a highest phase current and a second phase of the plurality of phases having a second highest phase current have an earlier position in the activation order than a third phase of the plurality of phases having a lowest phase current; determine, for the motor flux de-saturation process, an activation timing for each phase of the plurality of phases; and activate, using the voltage at a first angle and based on the activation order and the activation timing, the first phase and the second phase to activate corresponding first and second switches of the plurality of switches to de-saturate a highest flux generated via the highest phase current, thereby limiting an inrush current provided when starting the motor.

Clause 2: The system of clause 1, wherein the pre-start controller is further configured to activate the third phase to activate a corresponding third switch of the plurality of switches of the controller after the first and second switches are activated.

Clause 3: The system of clause 1 or 2, wherein the pre-start controller is further configured to activate the third phase when: a motor flux associated with the first and third phase matches a voltage source flux associated with the first and third phase; or a motor flux associated with the second and third phase matches a voltage source flux associated with the second and third phase, the third phase activated based on whichever matched first.

Clause 4: The system of clause 1, 2, or 3, wherein the pre-start controller is further configured to complete starting of the motor after the first, second, and third phases are activated.

Clause 5: The system of clause 1, 2, 3, or 4, wherein the pre-start controller is further configured to activate each switch of the plurality of switches after determination that a direct-on-line start for the motor has occurred.

Clause 6: The system of clause 1, 2, 3, 4, or 5, wherein the pre-start controller is further configured to initiate a soft-start control for the motor to start the motor if the direct-on-line start for the motor has not occurred.

Clause 7: The system of clause 1, 2, 3, 4, 5, or 6, wherein the pre-start controller is further configured to transmit, in response to each switch of the plurality of switches being activated, a signal to the controller indicating that the motor flux de-saturation process is finished.

Clause 8: The system of clause 1, 2, 3, 4, 5, 6, or 7, wherein the pre-start controller is further configured to: determine whether the first phase having the highest phase current is greater than or equal to zero; and use the voltage at the first angle to activate the first and second phases based on the first phase having the highest phase current being determined to be greater than or equal to zero.

Clause 9: The system of clause 1, 2, 3, 4, 5, 6, 7, or 8, wherein the pre-start controller is further configured to activate, using the voltage at a second angle and based on the first phase having the highest phase current being determined to be less than zero, the activation order, and the activation timing, the first phase and the second phase to activate corresponding first and second switches of the plurality of switches to de-saturate the highest flux generated via the highest phase current, thereby limiting an inrush current provided when starting the motor Clause 10: The system of clause 1, 2, 3, 4, 5, 6, 7, 8, and 9, wherein the pre-start controller is further configured to monitor a motor status associated with the motor to determine whether a fault in the motor, the voltage source, or a combination thereof, exists.

Clause 11: The system of clause 1, 2, 3, 4, 5, 6, 7, 8, 9 and 10, wherein the pre-start controller is further configured to save the at least one phase current flowing through the plurality of switches of the controller when the at least one phase current satisfies the threshold current.

Clause 12: The system of clause 1, 2, 3, 4, 5, 6, 7, 8, 9, 10 and 11, wherein the pre-start controller is further configured to determine the activation order for each phase of the plurality of phases based on an absolute value of each phase current of the plurality of phases.

Clause 13: A pre-start controller, comprising: control circuitry configured to: initialize, during a pre-start process, at least one control signal to activate operation of a controller comprising a plurality of switches and configured to control voltage delivered to a motor by a voltage source; activate each switch of the plurality of switches of the controller; determine whether at least one phase current flowing through the plurality of switches of the controller satisfies a threshold current; deactivate, based on the at least one phase current flowing through the at least one switch satisfying the threshold current, the plurality of switches of the controller; determine, for a motor flux de-saturation process, an activation order for each phase of the plurality of phases, wherein a first phase of the plurality of phases having a highest phase current and a second phase of the plurality of phases having a second highest phase current have an earlier position in the activation order than a third phase of the plurality of phases having a lowest phase current; and activate, using the voltage at a first angle and based on the activation order, the first phase and the second phase to activate corresponding first and second switches of the plurality of switches to de-saturate a highest flux generated via the highest phase current, thereby limiting an inrush current provided when starting the motor.

Clause 14: The pre-start controller of clause 13, wherein the control circuitry is further configured to receive a signal providing a value for the threshold to compare to the at least one phase current.

Clause 15: The pre-start controller of clause 13 or 14, wherein the control circuitry is further configured to determine, for the motor flux de-saturation process, an activation timing for each phase of the plurality of phases.

Clause 16: The pre-start controller of clause 13, 14, or 15, wherein the control circuitry is further configured to activate the first phase, the second phase, and third phase in accordance with the activation timing.

Clause 17: The pre-start controller of clause 13, 14, 15 or 16, wherein the control circuitry is further configured to de-saturate a second highest flux generated via the second highest phase current, a third highest flux generated via the lowest phase current, or a combination thereof.

Clause 18: A method comprising: initializing, during a pre-start process and by utilizing a pre-start controller, at least one control signal to activate operation of a controller comprising a plurality of switches and configured to control voltage delivered to a motor by a voltage source; activating each switch of the plurality of switches of the controller; determining whether at least one phase current flowing through the plurality of switches of the controller satisfies a threshold current; deactivating, based on the at least one phase current flowing through the at least one switch satisfying the threshold current, the plurality of switches of the controller; determining, for a motor flux de-saturation process, an activation order for each phase of the plurality of phases, wherein a first phase of the plurality of phases having a highest phase current and a second phase of the plurality of phases having a second highest phase current have an earlier position in the activation order than a third phase of the plurality of phases having a lowest phase current; and activating, using the voltage at a first angle and based on the activation order, the first phase and the second phase to activate corresponding first and second switches of the plurality of switches to de-saturate a highest flux generated via the highest phase current, thereby limiting an inrush current provided when starting the motor.

Claus 19: The method of clause 18, further comprising determining, for the motor flux de-saturation process, an activation timing for each phase of the plurality of phases; and activating the first phase and the second phase using the voltage at the first angle in accordance with the activation timing.

Clause 20: The method of clause 18, further comprising receiving a command to initialize the pre-start process.

What is claimed is:

1. A system, comprising:
a voltage source configured to provide voltage;
a motor comprising a plurality of phases;
a controller comprising a plurality of switches and configured to control the voltage delivered to the motor by the voltage source; and
a pre-start controller configured to:
initialize, during a pre-start process, at least one control signal to activate operation of the controller;
activate each switch of the plurality of switches of the controller;
determine whether at least one phase current flowing through the plurality of switches of the controller satisfies a threshold current;
deactivate, based on the at least one phase current flowing through the at least one switch satisfying the threshold current, the plurality of switches of the controller;
determine, for a motor flux de-saturation process, an activation order for each phase of the plurality of phases, wherein a first phase of the plurality of phases having a highest phase current and a second phase of the plurality of phases having a second highest phase current have an earlier position in the activation order than a third phase of the plurality of phases having a lowest phase current;
determine, for the motor flux de-saturation process, an activation timing for each phase of the plurality of phases; and
activate, using the voltage at a first angle and based on the activation order and the activation timing, the first phase and the second phase to activate corresponding first and second switches of the plurality of switches to de-saturate a highest flux generated via the highest phase current, thereby limiting an inrush current provided when starting the motor.

2. The system of claim 1, wherein the pre-start controller is further configured to activate the third phase to activate a corresponding third switch of the plurality of switches of the controller after the first and second switches are activated.

3. The system of claim 2, wherein the pre-start controller is further configured to activate the third phase when:
a motor flux associated with the first and third phase matches a voltage source flux associated with the first and third phase; or
a motor flux associated with the second and third phase matches a voltage source flux associated with the second and third phase, the third phase activated based on whichever matched first.

4. The system of claim 2, wherein the pre-start controller is further configured to complete starting of the motor after the first, second, and third phases are activated.

5. The system of claim 1, wherein the pre-start controller is further configured to activate each switch of the plurality of switches after determination that a direct-on-line start for the motor has occurred.

6. The system of claim 5, wherein the pre-start controller is further configured to initiate a soft-start control for the motor to start the motor if the direct-on-line start for the motor has not occurred.

7. The system of claim 1, wherein the pre-start controller is further configured to transmit, in response to each switch of the plurality of switches being activated, a signal to the controller indicating that the motor flux de-saturation process is finished.

8. The system of claim 1, wherein the pre-start controller is further configured to:
determine whether the first phase having the highest phase current is greater than or equal to zero; and
use the voltage at the first angle to activate the first and second phases based on the first phase having the highest phase current being determined to be greater than or equal to zero.

9. The system of claim 8, wherein the pre-start controller is further configured to:
activate, using the voltage at a second angle and based on the first phase having the highest phase current being determined to be less than zero, the activation order, and the activation timing, the first phase and the second phase to activate corresponding first and second switches of the plurality of switches to de-saturate the highest flux generated via the highest phase current, thereby limiting an inrush current provided when starting the motor.

10. The system of claim 1, wherein the pre-start controller is further configured to:

monitor a motor status associated with the motor to determine whether a fault in the motor, the voltage source, or a combination thereof, exists.

11. The system of claim 1, wherein the pre-start controller is further configured to:

save the at least one phase current flowing through the plurality of switches of the controller when the at least one phase current satisfies the threshold current.

12. The system of claim 1, wherein the pre-start controller is further configured to:

determine the activation order for each phase of the plurality of phases based on an absolute value of each phase current of the plurality of phases.

13. A pre-start controller, comprising:

control circuitry configured to:

initialize, during a pre-start process, at least one control signal to activate operation of a controller comprising a plurality of switches and configured to control voltage delivered to a motor by a voltage source;

activate each switch of the plurality of switches of the controller;

determine whether at least one phase current flowing through the plurality of switches of the controller satisfies a threshold current;

deactivate, based on the at least one phase current flowing through the at least one switch satisfying the threshold current, the plurality of switches of the controller;

determine, for a motor flux de-saturation process, an activation order for each phase of the plurality of phases, wherein a first phase of the plurality of phases having a highest phase current and a second phase of the plurality of phases having a second highest phase current have an earlier position in the activation order than a third phase of the plurality of phases having a lowest phase current; and activate, using the voltage at a first angle and based on the activation order, the first phase and the second phase to activate corresponding first and second switches of the plurality of switches to de-saturate a highest flux generated via the highest phase current, thereby limiting an inrush current provided when starting the motor.

14. The pre-start controller of claim 13, wherein the control circuitry is further configured to receive a signal providing a value for the threshold to compare to the at least one phase current.

15. The pre-start controller of claim 13, wherein the control circuitry is further configured to determine, for the motor flux de-saturation process, an activation timing for each phase of the plurality of phases.

16. The pre-start controller of claim 15, wherein the control circuitry is further configured to activate the first phase, the second phase, and third phase in accordance with the activation timing.

17. The pre-start controller of claim 13, wherein the control circuitry is further configured to de-saturate a second highest flux generated via the second highest phase current, a third highest flux generated via the lowest phase current, or a combination thereof.

18. A method, comprising:

initializing, during a pre-start process and by utilizing a pre-start controller, at least one control signal to activate operation of a controller comprising a plurality of switches and configured to control voltage delivered to a motor by a voltage source;

activating each switch of the plurality of switches of the controller;

determining whether at least one phase current flowing through the plurality of switches of the controller satisfies a threshold current;

deactivating, based on the at least one phase current flowing through the at least one switch satisfying the threshold current, the plurality of switches of the controller;

determining, for a motor flux de-saturation process, an activation order for each phase of the plurality of phases, wherein a first phase of the plurality of phases having a highest phase current and a second phase of the plurality of phases having a second highest phase current have an earlier position in the activation order than a third phase of the plurality of phases having a lowest phase current; and activating, using the voltage at a first angle and based on the activation order, the first phase and the second phase to activate corresponding first and second switches of the plurality of switches to de-saturate a highest flux generated via the highest phase current, thereby limiting an inrush current provided when starting the motor.

19. The method of claim 18, further comprising:

determining, for the motor flux de-saturation process, an activation timing for each phase of the plurality of phases; and activating the first phase and the second phase using the voltage at the first angle in accordance with the activation timing.

20. The method of claim 18, further comprising receiving a command to initialize the pre-start process.

* * * * *